United States Patent
Koito et al.

(10) Patent No.: US 9,549,173 B2
(45) Date of Patent: Jan. 17, 2017

(54) DISPLAY DEVICE

(71) Applicant: Japan Display Inc., Tokyo (JP)

(72) Inventors: Takeo Koito, Tokyo (JP); Toshinori Uehara, Tokyo (JP)

(73) Assignee: Japan Display Inc., Tokyo (JP)

( * ) Notice: Subject to any disclaimer, the term of this patent is extended or adjusted under 35 U.S.C. 154(b) by 240 days.

(21) Appl. No.: 14/289,156

(22) Filed: May 28, 2014

(65) Prior Publication Data

US 2014/0368622 A1 Dec. 18, 2014

(30) Foreign Application Priority Data

Jun. 14, 2013 (JP) .................. 2013-125841

(51) Int. Cl.
*H04N 13/04* (2006.01)

(52) U.S. Cl.
CPC ...... *H04N 13/0468* (2013.01); *H04N 13/0404* (2013.01); *H04N 13/0409* (2013.01); *H04N 13/0477* (2013.01)

(58) Field of Classification Search
None
See application file for complete search history.

(56) References Cited

U.S. PATENT DOCUMENTS

| 2007/0222775 A1* | 9/2007 | Hamagishi | ............ G02F 1/1323 345/204 |
| 2010/0259697 A1* | 10/2010 | Sakamoto | .......... G02B 27/2214 349/15 |
| 2012/0200677 A1 | 8/2012 | Saishu et al. | |
| 2012/0236402 A1 | 9/2012 | Ohyama | |
| 2013/0114134 A1 | 5/2013 | Inoue et al. | |
| 2013/0335648 A1* | 12/2013 | Kuroda | .................. G09G 3/003 349/15 |
| 2014/0192172 A1* | 7/2014 | Kang | ................. G02B 27/2214 348/55 |

FOREIGN PATENT DOCUMENTS

| CN | 102685536 A | 9/2012 |
| JP | 10-174127 A | 6/1998 |
| JP | 2005-164916 | 6/2005 |
| JP | 2012-155182 A | 8/2012 |

(Continued)

OTHER PUBLICATIONS

Taiwanese Office Action issued Apr. 10, 2015 for corresponding Taiwanese Application No. 103118876.

(Continued)

*Primary Examiner* — Sath V Perungavoor
*Assistant Examiner* — Dakshesh Parikh
(74) *Attorney, Agent, or Firm* — Michael Best & Friedrich LLP

(57) ABSTRACT

According to an aspect, a display device includes: a display section; a barrier section in which a plurality of unit regions are arranged in columns in a first direction, the plurality of unit regions extending in a second direction perpendicular to the first direction; and a plurality of light shields disposed at regular intervals for the display section such that a transmittance of light transmitted through a unit region is kept substantially the same regardless of a position of the unit region through which light is transmitted in the barrier section.

2 Claims, 19 Drawing Sheets

(56) References Cited

FOREIGN PATENT DOCUMENTS

| | | | | |
|---|---|---|---|---|
| JP | 2012155182 A | * | 8/2012 | ......... G02B 27/2214 |
| JP | 2012-194274 A | | 10/2012 | |
| JP | 2012-242443 | | 12/2012 | |
| JP | 2013-101171 A | | 5/2013 | |
| KR | 2012-0034581 A | | 4/2012 | |
| KR | 2012034581 A | * | 4/2012 | ......... G02B 27/2214 |
| TW | 201243433 A1 | | 11/2012 | |
| TW | 201310976 A1 | | 3/2013 | |

OTHER PUBLICATIONS

Japanese Office Action issued Apr. 5, 2016 for corresponding Japanese Application No. 2013-125841.
Korean Office Action mailed May 18, 2015 for corresponding Korean Application No. 10-2014-0070055.
Chinese Office Action issued Aug. 19, 2016 for corresponding Chinese Application No. 2014102582702.

* cited by examiner

FIG.12
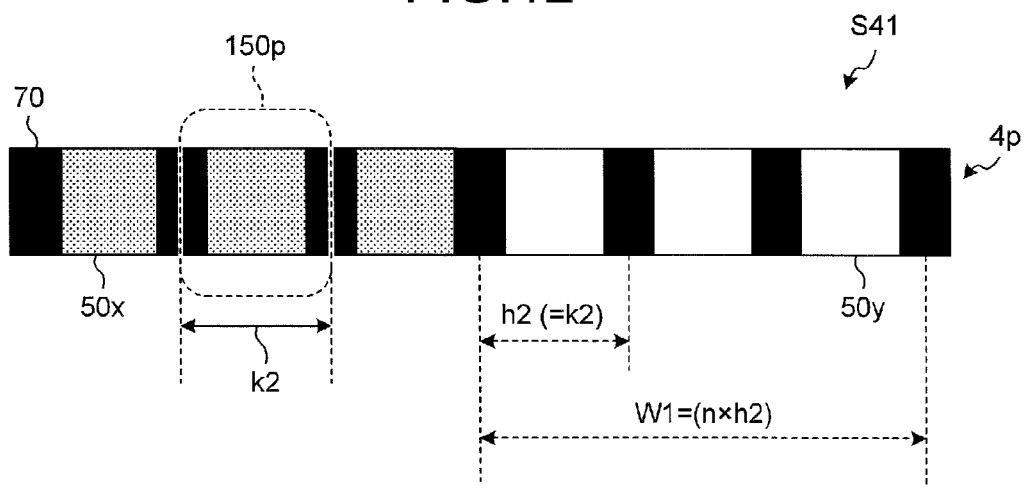
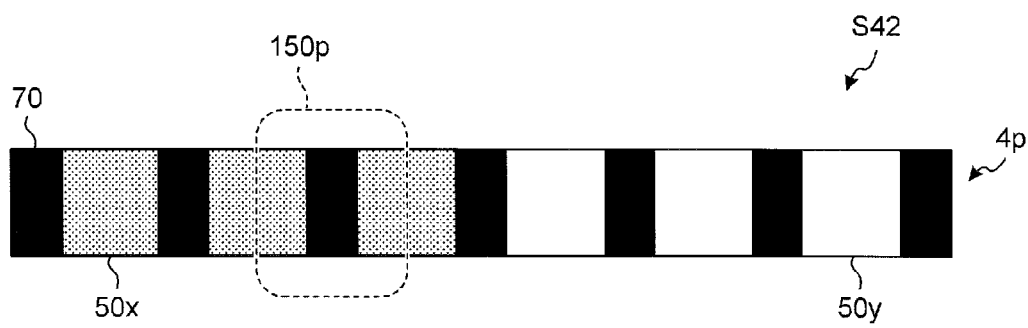
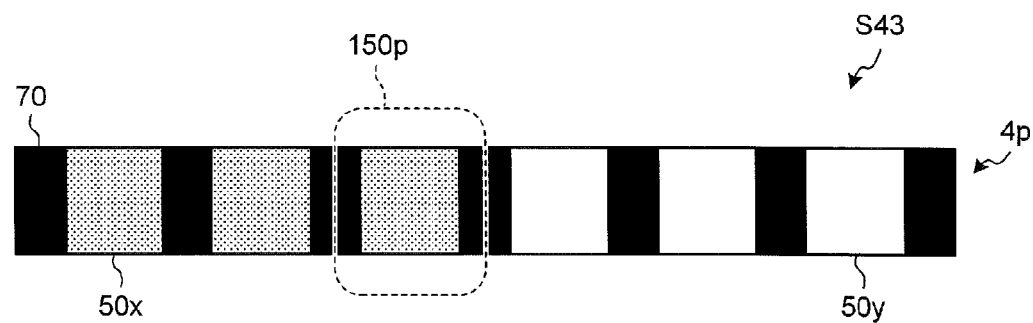

543 DISPLAY SECTION
542 KEYBOARD
541 MAIN BODY

551 UPPER HOUSING
554 DISPLAY
552 LOWER HOUSING

DISPLAY DEVICE

CROSS-REFERENCE TO RELATED APPLICATIONS

This application claims priority from Japanese Application No. 2013-125841, filed on Jun. 14, 2013, the contents of which are incorporated by reference herein in its entirety.

BACKGROUND

1. Technical Field

The present disclosure relates to a display device.

2. Description of the Related Art

Conventionally, a head tracking technique, an eye tracking technique, or the like, which controls an optical device layered on a display section based on a position of a user's viewpoint, has been known as a technique to be applied to a display device or the like. If a positional relationship between a user and a display device changes, luminance of light reaching to an eye of the user from the display device changes, thereby possibly generating what is called moire, which gives a feeling of strangeness to the user.

FIGS. 26 and 27 are diagrams for explaining moire. In FIG. 26, a display section 14 constituting a display device and a barrier section 16 serving as an optical device are layered in this order, for example. In a step S11 illustrated in FIG. 26, only light from each place of each pixel P1 in the display section 14 is incident on an eye E1 of a user through each predetermined region 16a in the barrier section 16. On the other hand, if the user moves in a direction closer to the display device as in a step S12 illustrated in FIG. 26, light from each place where the pixel P1 and a pixel P2 are adjacent to each other in the display section 14 (see M1 to M4 illustrated in FIG. 26) is incident on the eye E1 of the user through each predetermined region 16a in the barrier section 16.

In other words, in the step S11 illustrated in FIG. 26, the eye E1 of the user sees substantially the center of the pixel P1 as illustrated in a step S21 illustrated in FIG. 27. Therefore, the user senses light with predetermined luminance corresponding to a display color of the pixel P1. In the step S12 illustrated in FIG. 26, on the other hand, the eye E1 of the user sees a region A1 located in a boundary between the pixel P1 and the pixel P2 in addition to the pixel P1 and the pixel P2 adjacent to each other as illustrated in a step S22 of FIG. 27. Since a signal line, a transistor, etc., are disposed in the region A1, the region A1 has a light transmittance different from those of the pixel P1 and the pixel P2. If it is assumed that luminance is the same for the pixel P1 and the pixel P2 adjacent to each other, for example, the user senses light with luminance which is reduced by an amount equal to the luminance of the region A1. As described, for example, when the user moves closer to the display device, thereby changing the positional relationship between the user and the display device as illustrated in the steps S11 and S12 of FIG. 26, luminance of light reaching to the eye E1 of the user may change. Such a change in luminance of light reaching to the eye E1 of the user gives a feeling of strangeness to the user. This is what is called moire. The above-described head tracking technique or the like has a limited performance in tracking changes in a positional relationship between a user and a display device. Thus, the technique has a problem that it is difficult to prevent a generation of moire. In view of this, Japanese Patent Application Laid-open Publication No. 2012-242443 (JP-A-2012-242443) discloses a technique in which a distance between a barrier section serving as an optical device and a display device is adjusted for the purpose of preventing a generation of moire.

The technique disclosed in JP-A-2012-242443 is possible in principle. However, the technique has problems such as requiring highly-precise control in microns, a need to change a design size of a module mounting a barrier and a display device, and concern about deterioration in the optical property due to an air layer generated between the barrier and the display device.

For the foregoing reasons, there is a need for a display device capable of easily improving moire while maintaining the optical property without requiring precise control, a change in the design size, and the like.

SUMMARY

According to an aspect, a display device includes: a display section; a barrier section in which a plurality of unit regions are arranged in columns in a first direction, the plurality of unit regions extending in a second direction perpendicular to the first direction; and a plurality of light shields disposed at regular intervals for the display section such that a transmittance of light transmitted through a unit region is kept substantially the same regardless of a position of the unit region through which light is transmitted in the barrier section.

According to another aspect, a display device includes: a display section; a lens section disposed on a display surface side of the display section; and a plurality of light shields disposed at regular intervals for the display section such that luminance of light emitted from the lens section is kept substantially the same regardless of a light emitting position in the lens section.

BRIEF DESCRIPTION OF THE DRAWINGS

FIG. 12 is a diagram illustrating another example about transitions of a positional relationship between the unit region in the barrier section and the display section;

DETAILED DESCRIPTION

Modes for embodying a display device of the present disclosure (embodiments) will be described in detail with reference to the drawings. The present disclosure is not limited by the contents described in the following embodiments. Constituent elements described below include those readily envisaged by those skilled in the art and substantially the same constituent elements. Furthermore, the constituent elements described below can be appropriately combined with one another. A description will be given in the following order.

1. Embodiments (Display devices)
1-1. First embodiment
1-2. Second embodiment
2. Application examples (Electronic apparatuses)

Examples in which the display devices according to the embodiments above are applied to electronic apparatuses 3. Aspects of the present disclosure

1. EMBODIMENTS

The display device according to each of the embodiments to be described below can be applied, for example, to a display device for displaying a three-dimensional image by controlling a barrier section stacked above a display section, etc. Examples of the display section in the display device include, but are not limited to, an LCD (Liquid Crystal Display), MEMS (Micro Electro Mechanical Systems), an organic EL (Electro-Luminescence) display device, a plasma display device, etc.

The display device according to each of the embodiments can be applied to both of a display device for monochrome display and a display device for color display. In the case of the display device for color display, one pixel serving as a unit for forming a color image (unit pixel) is configured of a plurality of sub-pixels. More specifically, in the case of the display device for color display, one pixel is configured of three sub-pixels: a sub-pixel for displaying red (R), a sub-pixel for displaying green (G), and a sub-pixel for displaying blue (B), for example.

One pixel is not limited to the combination of the sub-pixels of the three primary colors, RGB. A sub-pixel of one color or sub-pixels of a plurality of colors can be further added to the sub-pixels of the three primary colors, RGB, to constitute one pixel. More specifically, a sub-pixel for displaying white (W) can be added to constitute one pixel for a luminance improvement or at least one sub-pixel for displaying a complementary color can be added to constitute one pixel in order to increase a color extended range, for example.

1-1. First Embodiment

Configuration

Figure 1:
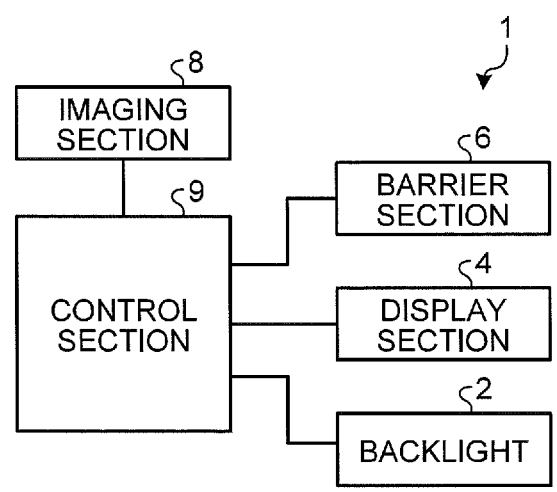
FIG. 1 is a block diagram illustrating one example of a functional configuration of a display device according to a first embodiment.
Figure 2:
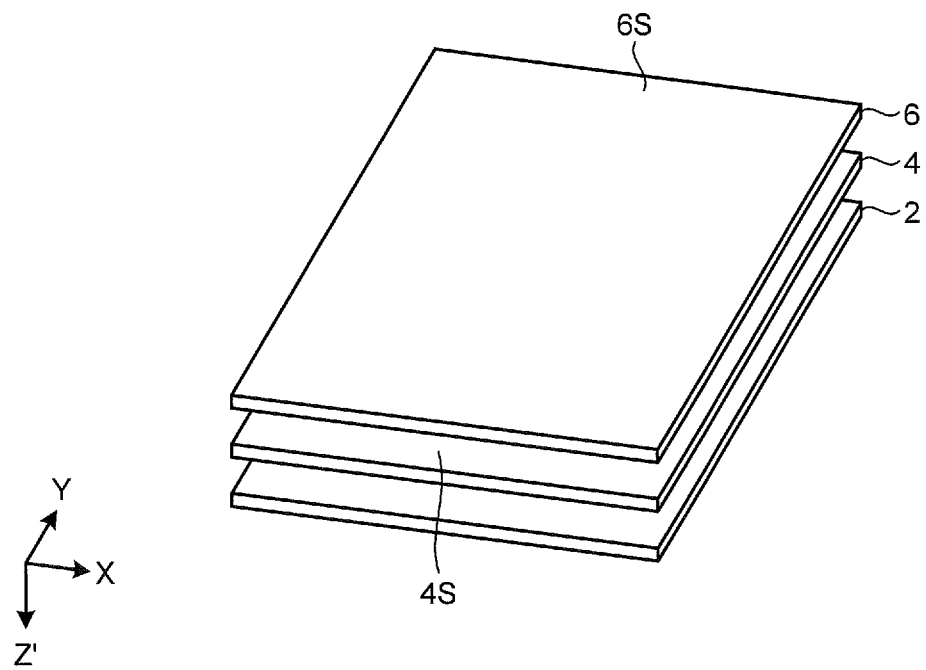
FIG. 2 is a perspective view illustrating one example of a configuration of a backlight, a display section, and a barrier section of the display device illustrated in FIG. 1.
Figure 3:
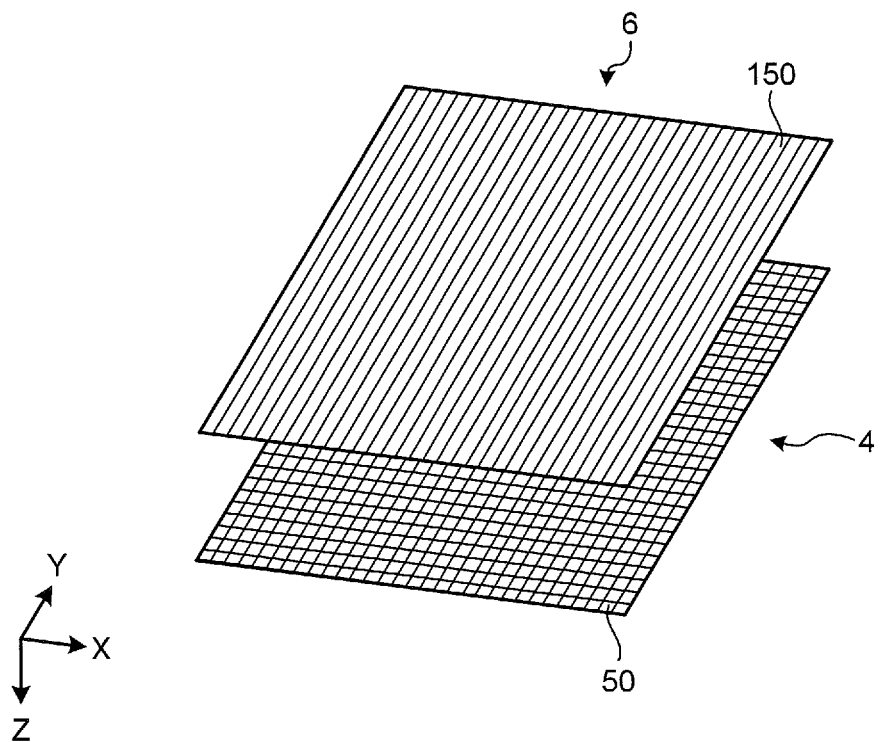
FIG. 3 is a perspective view illustrating a relationship between pixels in the display section and unit regions in the barrier section.

FIG. 1 is a block diagram illustrating one example of a functional configuration of a display device according to the first embodiment. FIG. 2 is a perspective view illustrating one example of a configuration of a backlight, a display section, and a barrier section of the display device illustrated in FIG. 1. FIG. 3 is a perspective view illustrating a relationship between pixels in the display section and unit regions in the barrier section. FIGS. 2 and 3 are schematic illustrations and do not necessarily correspond to actual sizes and shapes. A display device 1 illustrated in FIG. 1 is one example of the display device of the present disclosure, for example.

The display device 1 displays an image recognizable as a three-dimensional image by a user looking at a screen from a predetermined position with the naked eyes, for example. As illustrated in FIG. 1, the display device 1 includes a backlight 2, a display section 4, a barrier section 6, an imaging section 8, and a control section 9. In the display device 1, the backlight 2, the display section 4, and the barrier section 6 are stacked in this order, for example.

The backlight 2 is a planar lighting device for emitting planar light toward the display section 4. The backlight 2 includes a light source and a light guide plate, for example. From an emitting surface facing the display section 4, the backlight 2 outputs light emitted from the light source while scattering the light with the light guide plate. When organic EL display is employed for the display section 4, the display section 4 itself becomes luminous. Therefore, there is no need to provide the backlight 2.

The display section 4 is a device for displaying an image. As illustrated in FIG. 3, the display section 4 is a liquid crystal panel including a plurality of pixels 50 arranged in a two-dimensional array. The light emitted from the backlight 2 enters the display section 4. The display section 4 displays an image on a display surface (for example, 4S in FIG. 2) by switching, for the light entering into each of the pixels 50, between being transmitted and being shielded, for example.

The barrier section 6 is an optical device. The barrier section 6 is disposed at the side of the display surface (for example, 4S in FIG. 2) of the display section 4 where an image is displayed, i.e., the surface opposite to the surface facing the backlight 2. In the barrier section 6, a plurality of unit regions 150 extending in a second direction (for example, a Y-axis direction illustrated in FIGS. 2 and 3) perpendicular to a first direction (for example, an X-axis direction illustrated in FIGS. 2 and 3) horizontal to the display surface (for example, 4S in FIG. 2) of the display section 4 are arranged in columns. The barrier section 6 is a liquid crystal panel. The barrier section 6 partially applies a voltage to a target transmissive region or light-shielding region to orient liquid crystals, thereby switching, for the light entering into each of the unit regions 150, between being transmitted through a surface where light is emitted (for example, 6S in FIG. 2) and being shielded. The barrier section 6 thereby adjusts regions where an image displayed on the display section 4 is transmitted and shielded. Instead of the barrier section 6, a liquid crystal lens or the like may be applied to the display device 1. In the configuration illustrated in FIG. 2, the barrier section 6 is disposed at the side of the display surface of the display section 4 where an image is displayed, i.e., the surface opposite to the surface facing the backlight 2. However, the barrier section 6 may be provided between the backlight 2 and the display section 4. The barrier section 6 adjusts a region where an image is displayed and a region where an image is not displayed in the display section 4 by switching, for the light entering from the backlight 2 into each of the unit regions 150 of the barrier section 6, between being transmitted through the surface of the barrier section 6 where light is emitted and being shielded.

In order to allow a user to recognize a three-dimensional image, of the plurality of pixels, an image for a right eye and an image for a left eye are displayed on a pixel for a right eye and a pixel for a left eye, respectively. The image for a right eye and the image for a left eye are shielded by the barrier section 6 so as to prevent them from being incident on the left eye and the right eye of the user, respectively.

Display Section 4 and Barrier Section 6

Figure 4:
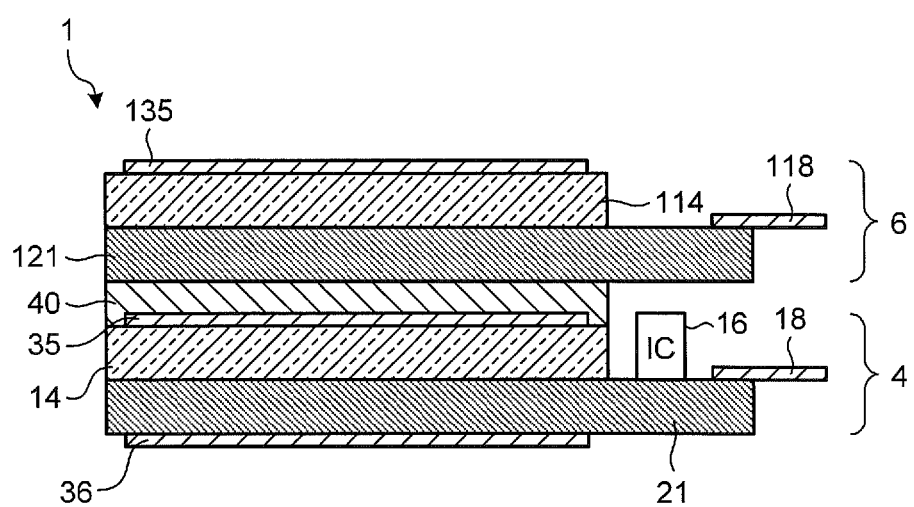
FIG. 4 is a schematic view illustrating a general configuration of a module mounting the display section and the barrier section.
Figure 5:
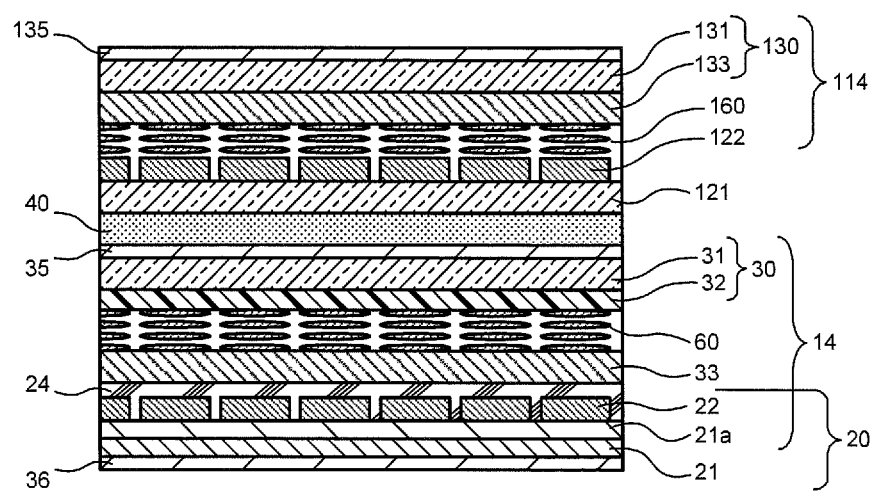
FIG. 5 is a cross-sectional view illustrating a general cross-sectional structure of the module mounting the display section and the barrier section.
Figure 6:
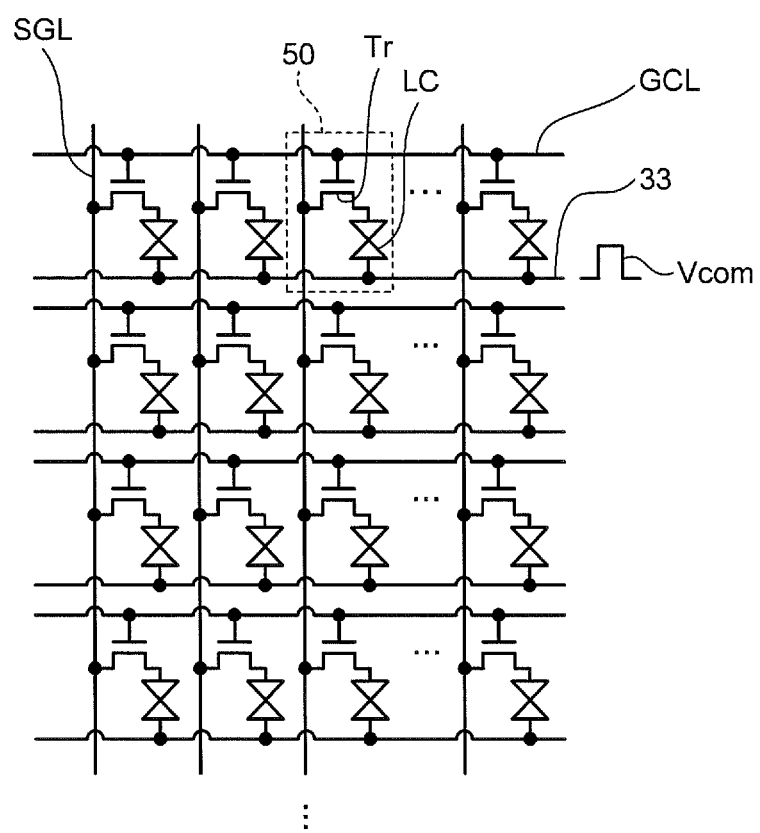
FIG. 6 is a circuit diagram illustrating pixel display in the display section.
Figure 7:
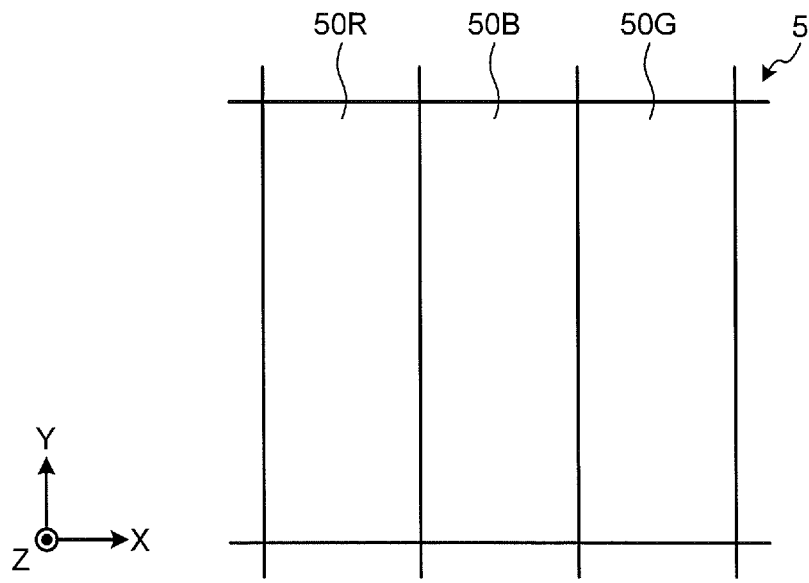
FIG. 7 is a schematic view of a pixel in color display.
Figure 8:
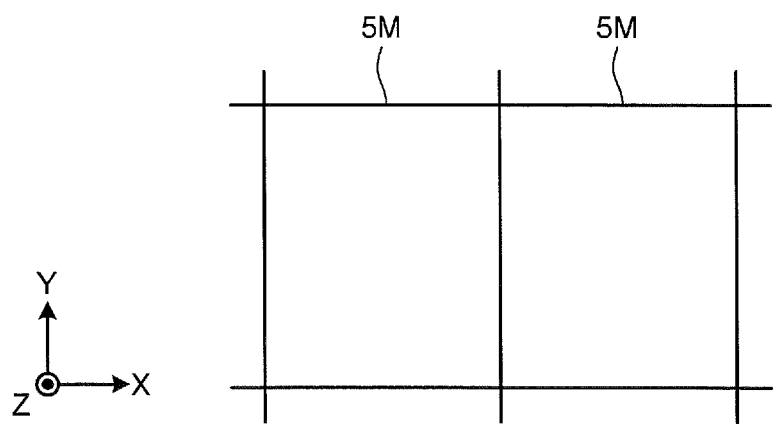
FIG. 8 is a schematic view of a pixel in monochrome display.

A configuration example of the display section 4 and the barrier section 6 will be described below. FIG. 4 is a schematic view illustrating a general configuration of a module mounting the display section and the barrier section. FIG. 5 is a cross-sectional view illustrating a general cross-sectional configuration of the module mounting the display section and the barrier section. FIG. 6 is a circuit diagram illustrating pixel display in the display section. FIG. 7 is a schematic view of a pixel in color display. FIG. 8 is a schematic view of a pixel in monochrome display.

As illustrated in FIG. 4, the display section 4 and the barrier section 6 are stacked in the display device 1. The display section 4 and the barrier section 6 are bonded to each other with an adhesive layer 40 in the display device 1. The adhesive layer 40 is made of a light-transmitting adhesive, for example, a resin, whose change in transmittance is small for light-transmitting portions in the display section 4 and the barrier section 6. The display device 1 can achieve a state in which no air layer is present between the display section 4 and the barrier section 6 by layering the display section 4 and the barrier section 6 with the use of the adhesive layer 40. The adhesive layer 40 has optical isotropy. In other words, the adhesive layer 40 has no polarization property.

The display section 4 includes: a light-transmitting substrate 21, a pixel array section 14 formed on the light-transmitting substrate 21, a driver IC 16 having functions of an interface (I/F) and a timing generator, and a flexible printed circuit (FPC) 18. In the display section 4, the pixel array section 14, the driver IC 16, and the FPC 18 are provided on the light-transmitting substrate 21. As described, the pixel array section 14 is layered on the light-transmitting substrate 21 in the display section 4. In the display section 4, a polarizing plate 35 is disposed on a side of the pixel array section 14 opposite to the light-transmitting substrate 21, i.e., on the side of the barrier section 6. In the display section 4, a polarizing plate 36 is disposed on a surface of the light-transmitting substrate 21 opposite to the pixel array section 14, i.e., on the surface facing the backlight 2. In other words, in the display section 4, the polarizing plate 36, the light-transmitting substrate 21, the pixel array section 14, and the polarizing plate 35 are layered in this order from the backlight 2 side toward the barrier section 6. In the display section 4, the adhesive layer 40 is layered on the polarizing plate 35.

In the pixel array section 14, the pixels 50 including a liquid crystal layer have a matrix (a form of rows and columns) configuration in which units, each constituting one pixel for display, are arranged in m rows×n columns. A master clock, a horizontal synchronization signal, and a vertical synchronization signal, which are external signals, are inputted into the driver IC 16 from the outside. The driver IC 16 performs a level conversion on the master clock, horizontal synchronization signal, and vertical synchronization signal having a voltage magnitude of an external power supply to obtain those having a voltage magnitude of an internal power supply required for driving liquid crystals. The driver IC 16 generates a vertical start pulse, a vertical clock pulse, a horizontal start pulse, and a horizontal clock pulse by passing the master clock, the horizontal synchronization signal, and the vertical synchronization signal that are level-converted through a timing generator. The driver IC 16 provides the generated signals to the pixel array section 14. One end of the FPC 18 is coupled to a circuit (a TFT layer to be described later) formed on a surface of the light-transmitting substrate 21 and the other end thereof is coupled to an external circuit. The FPC 18 is coupled to the driver IC 16 via the light-transmitting substrate 21. The FPC 18 transmits an external signal to the driver IC 16 or a drive power for driving the driver IC 16.

The barrier section 6 includes: a light-transmitting substrate 121, an electrode section 114 formed on the light-transmitting substrate 121, and a flexible printed circuit (FPC) 118, for example. The barrier section 6 of the present embodiment only performs switching between display and non-display of a predetermined image as will be described later in detail. Thus, display switching is performed using the electrode section 114 on the light-transmitting substrate 121. Such display switching can be performed with a driver coupled to the electrode section 114. In addition to such a driver, a driver IC having functions of an interface (I/F) and a timing generator may be further included. In the barrier section 6, the electrode section 114 and the FPC 118 are provided on the light-transmitting substrate 121. As described, the electrode section 114 is layered on the light-transmitting substrate 121 in the barrier section 6. In the barrier section 6, a polarizing plate 135 is disposed on a side of the electrode section 114 opposite to the light-transmitting substrate 121, i.e., on the display surface side from which an image is outputted. In other words, in the barrier section 6, the light-transmitting substrate 121, the electrode section 114, and the polarizing plate 135 are layered in this order from the display section 4 side toward the surface from which an image is outputted. In the barrier section 6, the adhesive layer 40 is layered on the surface of the light-transmitting substrate 121 opposite to the electrode section 114 side. In other words, the adhesive layer 40 is interposed between the polarizing plate 35 and the light-transmitting substrate 121.

In the electrode section 114, the pixels 50 including a later-described liquid crystal layer have a configuration in which units, each constituting one pixel for display, are arranged in columns in one direction. One end of the FPC 118 is coupled to the electrode section 114 on the light-transmitting substrate 121 or wiring coupled to the electrode section 114. The other end of the FPC 118 is coupled to an external circuit. The FPC 118 transmits an external signal to a circuit of the light-transmitting substrate 121 or a drive power for driving the circuit.

With reference to FIG. 5, a layered structure of the display section 4 and the barrier section 6 will be described below in detail. The display section 4 is a liquid crystal display panel of what is called a transverse electric field mode such as an FFS (Fringe Field Switching) mode. As substitute for the FFS mode, an IPS (In Plane Switching) mode may be used as the transverse electric field mode. While the liquid crystal display panel of the transverse electric field mode is used as the display section 4 of the present embodiment, a liquid crystal display panel of a vertical electric field mode may also be used. As illustrated in FIG. 5, the display section 4 includes: a pixel substrate 20 including the light-transmitting substrate 21; a counter substrate 30 disposed in an opposing manner in a direction vertical to a surface of the pixel substrate 20; a common electrode 33 layered on the pixel substrate 20; a liquid crystal layer 60 inserted between the pixel substrate 20 and the counter substrate 30; the polarizing plate 35; and the polarizing plate 36.

The pixel substrate 20 includes: the light-transmitting substrate 21; a TFT layer 21a provided on the light-transmitting substrate 21, in which active elements (switching elements), for example, TFT (Thin Film Transistor) elements Tr, are formed so as to correspond to pixels; a plurality of pixel electrodes 22 disposed in a matrix on the TFT layer 21a of the light-transmitting substrate 21; and an insulating layer 24. In the TFT layer 21a, the TFT (Thin Film Transistor) element Tr in each of the pixels 50 illustrated in FIG. 6 and wiring such as pixel signal lines SGL, each for providing a pixel signal to the respective pixel electrodes 22, and scanning signal lines GCL, each for driving the respective TFT elements Tr, are formed. The polarizing plate 36 is layered on the surface of the light-transmitting substrate 21 opposite to the surface where the pixel electrodes 22 are formed on the TFT layer 21a. The insulating layer 24 is a film made of a material having an insulation property such as silicon nitride. The insulating layer 24 is layered on the surfaces of the pixel electrodes 22 and the TFT layer 21a. The insulating layer 24 provides insulation between the pixel electrodes 22 and the common electrode 33.

The common electrode 33 is a sheet-like electrode layered on the insulating layer 24 in the pixel substrate 20. The common electrode 33 is a light-transmitting electric conductor made of a light-transmitting conductive material such as an ITO (Indium Tin Oxide) or an IZO (Indium Zinc Oxide). The common electrode 33 is coupled to common electrode wiring. While the common electrode 33 of the present embodiment is the sheet-like electrode, multi-divided split electrodes may be employed. In this case, the common electrode 33 is disposed, for example, such that one split electrode corresponds to one pixel electrode 22 (the pixel electrode 22 constituting one row). Alternatively, the common electrode 33 may be such an electrode that one split electrode is a plate-like electrode shared by a plurality of pixel electrodes 22. The common electrode 33 opposes the pixel electrodes 22 in the vertical direction (for example, a Z-axis direction) to the surface of the light-transmitting substrate 21. The common electrode 33 extends in a direction parallel to the extending direction of the above-described pixel signal line SGL in a plane parallel to the surface of the light-transmitting substrate 21. The common electrode 33 is configured so that a common signal with an alternating-current rectangular waveform is applied to the common electrode 33 from a drive electrode driver via a contact conducting column (not illustrated) having a conductive property.

The pixel signal line SGL extends in a plane parallel to the surface of the light-transmitting substrate 21 and provides a pixel signal for displaying an image to the pixels. The pixel substrate 20 illustrated in FIG. 6 has the plurality of pixels 50 arranged in a matrix. The pixel 50 includes the TFT element Tr and a liquid crystal element LC. In the example illustrated in FIG. 6, the TFT element Tr is composed of an n-channel MOS (Metal Oxide Semiconductor) type TFT. A source of the TFT element Tr is coupled to the pixel signal line SGL, a gate thereof is coupled to the scanning signal line GCL, and a drain thereof is coupled to one end of the liquid crystal element LC. One end of the liquid crystal element LC is coupled to the drain of the TFT element Tr and the other end thereof is coupled to the common electrode 33.

Each of the pixels 50 is mutually coupled to other pixels belonging to the same row of the pixel substrate 20 through the scanning signal line GCL. The scanning signal line GCL is coupled to a gate driver and provided with a scanning signal (Vscan) by the gate driver. Each of the pixels 50 is also mutually coupled to other pixels belonging to the same column of the pixel substrate 20 through the pixel signal line SGL. The pixel signal line SGL is coupled to a source driver and provided with a pixel signal Vpix by the source driver. Furthermore, each of the pixels 50 is mutually coupled to other pixels belonging to the same row of the pixel substrate 20 through the common electrode 33. The common electrode 33 is coupled to the drive electrode driver and provided with a drive signal Vcom by the drive electrode driver. In other words, the plurality of pixels 50 belonging to the same one row share one common electrode 33 in the example illustrated in FIG. 6.

The display section 4 applies the scanning signal (Vscan) to the gates of the TFT elements Tr in the pixels 50 by the gate driver through the scanning signal line GCL illustrated in FIG. 6. As a result, one row (one horizontal line) of the pixels 50 formed in a matrix in the pixel substrate 20 is sequentially selected to be driven for display. The display section 4 provides the pixel signal Vpix to the respective pixels 50 constituting sequentially-selected one horizontal line by the source driver through the pixel signal line SGL illustrated in FIG. 6. In these pixels 50, display for one horizontal line is performed in accordance with the provided pixel signal Vpix. The display section 4 applies the drive signal Vcom to drive the common electrode 33.

As described above, the display section 4 drives the scanning signal lines GCL to be line-sequentially scanned in a time-divisional manner. As a result, one horizontal line is sequentially selected. The display section 4 provides the pixel signal Vpix to the pixels 50 belonging to one horizontal line. As a result, display is performed one horizontal line at a time. When performing this display operation, the display section 4 applies the drive signal Vcom to a block containing the common electrode 33 corresponding to that one horizontal line.

The counter substrate 30 includes a glass substrate 31 and a color filter 32 formed on one surface of the glass substrate 31. The polarizing plate 35 is disposed on the other surface of the glass substrate 31. The barrier section 6 is layered on the surface of the polarizing plate 35 opposite to the glass substrate 31 side.

For the color filter 32, filters, which are colored to have three colors of red (R), green (G), and blue (B), for example, are cyclically arranged so as to associate the three colors R, G, and B as one set with each of the above-described pixels 50 illustrated in FIG. 6. Specifically, as illustrated in FIG. 7, one pixel serving as a unit for forming a color image, i.e., a unit pixel 5, includes a plurality of sub-pixels, for example. In this example, the unit pixel 5 includes a sub-pixel 50R for displaying R, a sub-pixel 50B for displaying B, and a sub-pixel 50G for displaying G. The sub-pixels 50R, 50B, and 50G included in the unit pixel 5 are arranged in the X direction, i.e., toward the row direction of the display device 1. The color filter 32 faces the liquid crystal layer 60 in the vertical direction (for example, the Z-axis direction illustrated in FIGS. 2 and 3) to the surface of the light-transmitting substrate 21. The color filter 32 may have a combination of other colors as long as the colors of the filters are different from each other.

The unit pixel 5 may further include a sub-pixel of one color or sub-pixels of a plurality of colors. When the liquid crystal display device only deals with monochrome display, one pixel serving as a unit for forming a monochrome image, i.e., a unit pixel 5M, corresponds to the pixel 50 (a sub-pixel in a color image) as illustrated in FIG. 8. The unit pixel 5 is a basic unit for displaying a color image and the unit pixel 5M is a basic unit for displaying a monochrome image.

The liquid crystal layer 60 is a region between the pixel substrate 20 and the counter substrate 30 and liquid crystals are injected thereinto. The liquid crystal layer 60 modulates light passing therethrough according to a state of an electric field thereof. An orientation film may be disposed between the liquid crystal layer 60 and the pixel substrate 20. An orientation film may be disposed between the liquid crystal layer 60 and the counter substrate 30. An incident-side polarizing plate may be disposed on the lower surface side of the pixel substrate 20.

In the display section 4, while the pixel electrodes 22 and the common electrode 33 are layered in this order on the light-transmitting substrate 21, i.e., the common electrode 33 is positioned on the liquid crystal layer 60 side, the layering order is not limited thereto. In the display section 4, the common electrode 33 and the pixel electrodes 22 may be layered in this order on the light-transmitting substrate 21, i.e., the pixel electrodes 22 are positioned on the liquid crystal layer 60 side. In this case, the pixel electrodes 22 and the TFT elements Tr or the like are coupled to each other with wiring not in contact with the common electrode 33.

The barrier section 6 is a liquid crystal display panel of the vertical electric field mode in which barrier electrodes (pixel electrodes) and a common electrode are disposed with a liquid crystal layer interposed therebetween. In the barrier section 6, the electrode section 114 is formed on the glass substrate 121 which is a light-transmitting substrate. The electrode section 114 includes: a plurality of barrier electrodes 122 formed on the glass substrate 121 and disposed in columns; a counter substrate 130 disposed in an opposing manner in a direction vertical to the surface of the glass substrate 121; and a liquid crystal layer 160 inserted between the glass substrate 121 and the counter substrate 130. The polarizing plate 135 is layered on the surface of the barrier section 6 on the counter substrate 130 side.

The barrier electrode 122 has a shape similar to that of the unit region 150 illustrated in FIG. 3. The barrier electrode 122 has an elongated plate shape extending along the second direction. The barrier electrodes 122 are disposed in columns in the first direction. A voltage is applied to the barrier electrode 122 via the FPC 118. The barrier electrode 122 forms an electric field with a common electrode 133 upon the application of the voltage. The barrier electrode 122 changes the electric field formed in the common electrode 133 according to the applied voltage.

The counter substrate 130 includes a glass substrate 131 and the common electrode 133 formed on one surface of the glass substrate 131. The counter substrate 130 may include an overcoat layer. The polarizing plate 135 is disposed on the other surface of the glass substrate 131. The common electrode 133 is a sheet-like electrode. The common electrode 133 is a light-transmitting electric conductor made of a light-transmitting conductive material such as an ITO or an IZO. The common electrode 133 is coupled to common electrode wiring to be operated as a so-called common electrode.

The common electrode 133 according to the present embodiment functions as a common drive electrode (counter electrode) in the barrier section 6. While the common electrode 133 in the barrier section 6 drives the entire region in synchronization, the entire region may be divided into a plurality of regions in a direction along which the barrier electrodes 122 are arranged. The common electrode 133 is configured so that a common signal with an alternating-current rectangular waveform is applied to the common electrode 133 from a drive electrode driver via a contact conducting column (not illustrated) (for example, Micropearl AU manufactured by SEKISUI CHEMICAL CO., LTD.) having a conductive property.

The liquid crystal layer 160 is a region between the glass substrate 121 and the counter substrate 130 and liquid crystals are injected thereinto. The liquid crystal layer 160 modulates light passing therethrough according to a state of an electric field thereof. For example, liquid crystals in various modes such as TN (Twisted Nematic), VA (Vertical Alignment), or ECB (Electrically Controlled Birefringence) are used. In the barrier section 6, an orientation film is provided between the liquid crystal layer 160 and the glass substrate 121 and an orientation film is provided between the liquid crystal layer 160 and the counter substrate 130. The alignment films act to direct an orientation direction (rubbing direction) of the liquid crystals in the liquid crystal layer 160 to a predetermined direction. With the above-described structure of the barrier section 6, the layered structure can be simplified. As with the display section 4, the TFT elements may be provided on the glass substrate 121 in the barrier section 6 and a voltage to be applied to the barrier electrodes 122 may be controlled with the TFT elements. A light-transmitting substrate made of a light-transmitting material may be used as substitute for the glass substrate.

The display section 4 and the barrier section 6 have the structures as described above. By switching a voltage to be applied to the pixel electrodes 22 and the barrier electrodes 122 based on a signal from the control section 9, an image visually recognized by a user in three dimensions is displayed.

The imaging section 8 is an apparatus for capturing an image such as a camera. For example, in a display device for displaying a three-dimensional image by controlling the barrier section 6, a so-called head tracking technique or the like is utilized. In the head tracking technique, transmission and shielding of light in the barrier section 6 are controlled based on positional information of a user so that an image for a right eye is incident on the right eye of the user and an image for a left eye is incident on the left eye of the user. The image of the user obtained by the imaging section 8 is used to identify a position (for example, eyeball position) of the user.

The control section 9 controls the operations of various sections in the display device 1. Specifically, the control section 9 controls the lighting and extinction of the backlight 2, and a light amount and a light intensity when the backlight 2 is lit. The control section 9 also controls an image to be displayed on the display section 4. The control section 9 also controls the operations (transmission and shielding) of each of the unit regions 150 in the barrier section 6. The control section 9 also controls the imaging operation of the imaging section 8. The control section 9 performs head tracking by using images of a user captured by the imaging section 8 and controls an image to be displayed on the display section 4 and the operations (transmission and shielding) of each of the unit regions 150 in the barrier section 6. Display of a three-dimensional image is thereby achieved.

The control section 9 includes a CPU (Central Processing Unit) which is an arithmetic device, and a memory which is a storage device, for example. The control section 9 can also execute programs with these hardware resources to implement various functions. Specifically, the control section 9, for example, reads a program stored in a storage section (not illustrated), loads the program into the memory, and causes the CPU to execute instructions contained in the program loaded into the memory. In accordance with the results of the instructions executed by the CPU, the control section 9 controls: the lighting and extinction of the backlight 2, and a light amount and a light intensity when the backlight 2 is lighted; an image to be displayed on the display section 4; the operations (transmission and shielding) of each of the unit regions 150 in the barrier section 6, etc.

Method for Disposing Light Shields

Figure 9:
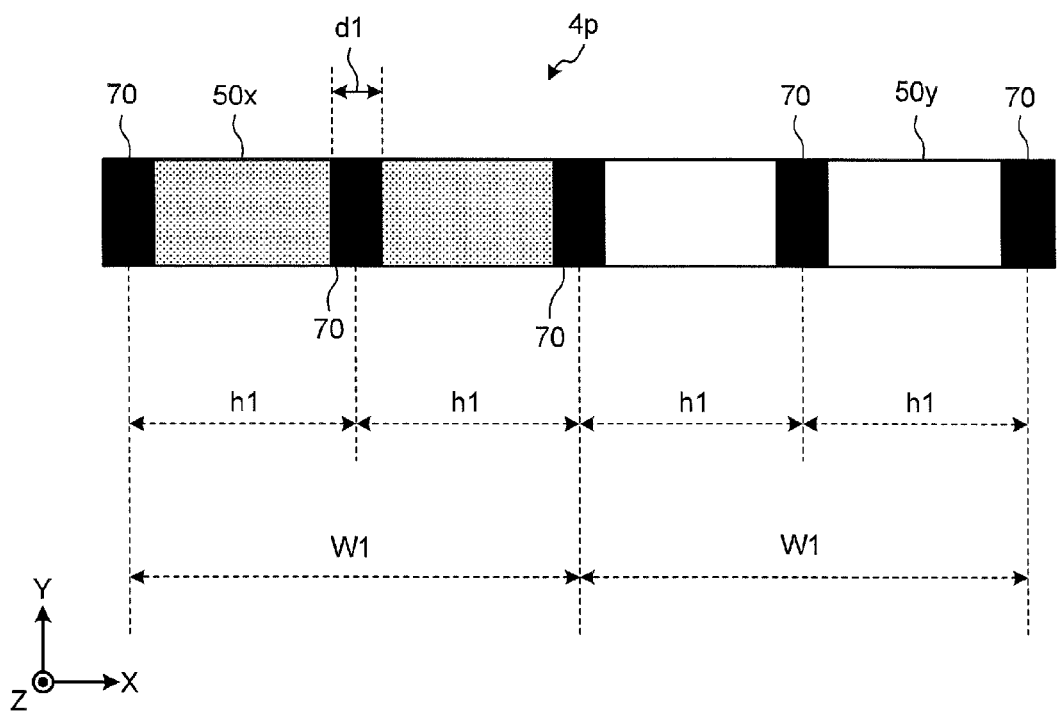
FIG. 9 is a diagram illustrating one example of a method for disposing light shields in the first embodiment.
Figure 10:
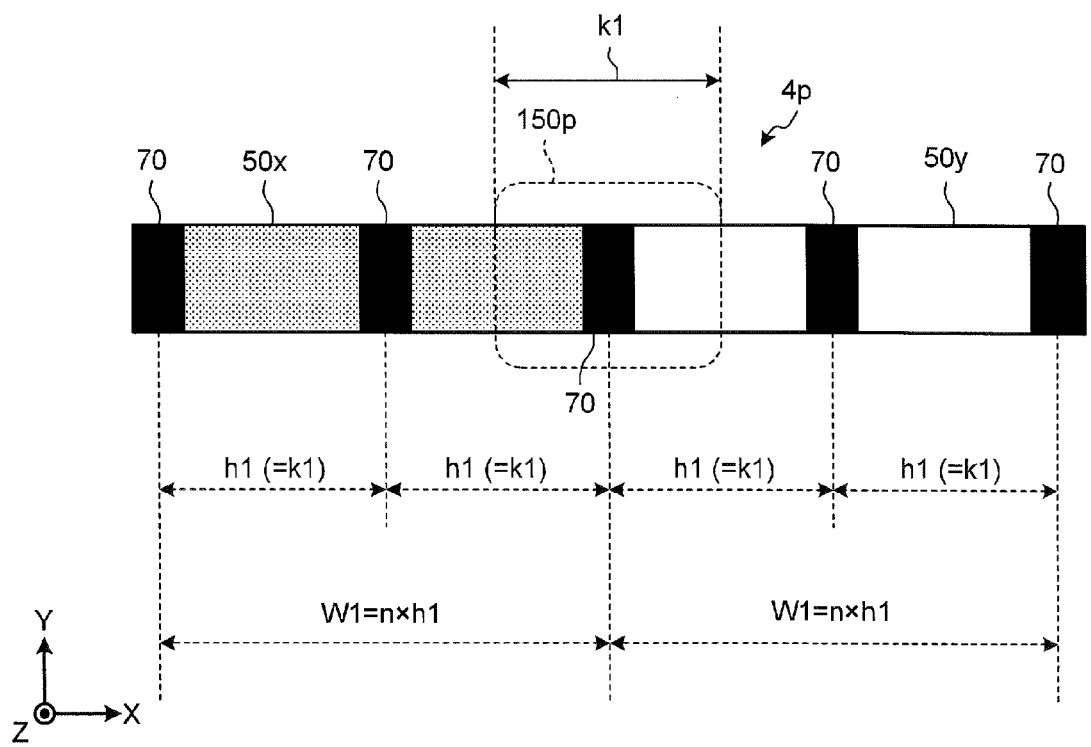
FIG. 10 is a diagram illustrating one example of the method for disposing light shields in the first embodiment.

A method for disposing light shields in the first embodiment will be described below. FIGS. 9 and 10 are diagrams illustrating one example of the method for disposing light shields in the first embodiment. The reference numeral 4$p$ in FIGS. 9 and 10 represents a portion of the display section 4. The reference numerals 50$x$ and 50$y$ in FIGS. 9 and 10 represent pixels disposed in the display section 4. The reference numeral 70 in FIGS. 9 and 10 represents a light shield. The reference numeral d1 in FIG. 9 represents a width of the light shield 70. The reference numeral W1 in FIGS. 9 and 10 represents a pixel width in a tracking direction (X-axis direction) when performing head tracking, for example. The reference numeral h1 in FIGS. 9 and 10 represents an interval of disposing the light shields 70. The reference numeral 150$p$ in FIG. 10 represents a portion of the unit region 150 through which light is transmitted and is referred to as an opening in the following description. The reference numeral k1 in FIG. 10 represents a width of the unit region 150 through which light is transmitted.

As illustrated in FIG. 9, the light shields 70 are disposed for the display section 4 at regular intervals h1 in the X-axis direction in the display device 1 according to the first embodiment. At this time, the light shields 70 are disposed so as to satisfy a relationship in which the interval h1 in the X-axis direction when disposing the light shields 70 in the display section 4 equals the width k1 of the opening 150$p$ of the unit region 150 through which light is transmitted as illustrated in FIG. 10 and a product of the interval h1 times n (n is an integer greater than or equal to 1) equals the pixel width W1 when performing head tracking.

Figure 11:
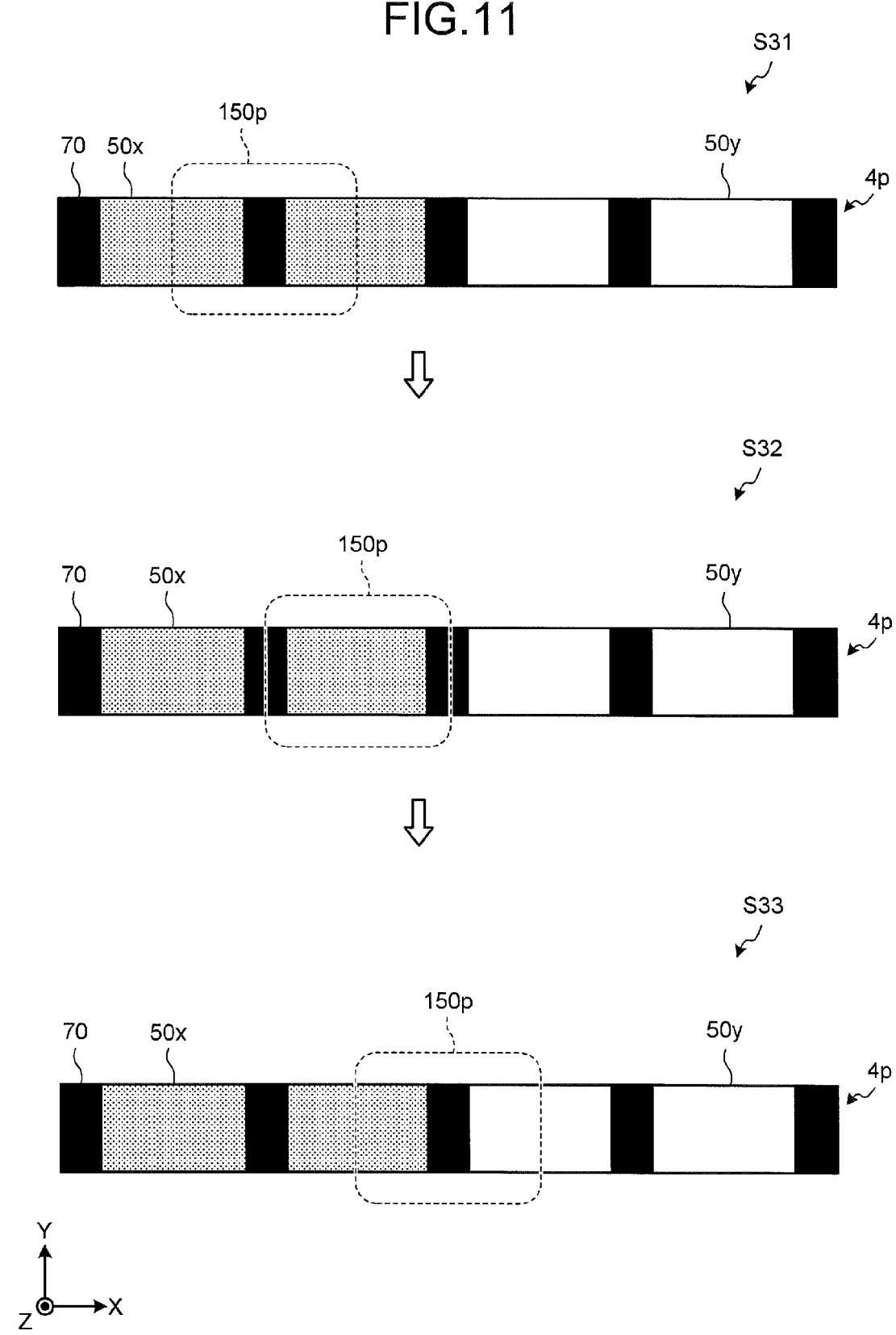
FIG. 11 is a diagram illustrating one example about transitions of a positional relationship between the unit region in the barrier section and the display section.

FIG. 11 is a diagram illustrating one example regarding transitions of a positional relationship between the unit region in the barrier section and the display section. Steps S31 to S33 illustrated in FIG. 11 represent how the positional relationship between the unit region 150 in the barrier section 6 and the display section 4 transitions as a result of switching of the unit region 150 in the barrier section 6 due to head tracking or a movement of a user in the Z-axis direction. As illustrated in FIG. 11, even when the positional relationship between the unit region 150 in the barrier section 6 and the display section 4 transitions, an area occupied by the light shield 70 is kept the same at a position in the display section 4 corresponding to the position of the opening 150$p$. Therefore, given that light transmittances in the pixels 50$x$ and 50$y$ are substantially the same, the transmittance of light transmitted through the opening 150$p$ is kept substantially the same. When a human ability to visually recognize light is taken into consideration, it is only necessary to dispose the light shields 70 at least such that a difference in luminance of light visually recognized by human eyes falls within a range of about 30% to 40% between before and after the transition of the positional relationship between the unit region 150 in the barrier section 6 and the display section 4. When a human sense to light is taken into consideration (when a feeling of strangeness is suppressed), it is only necessary to dispose the light shields 70 at least such that a difference in luminance of light visually recognized by human eyes falls within a range of about 10% to 20% between before and after the transition of the positional relationship between the unit region 150 in the barrier section 6 and the display section 4. The light shield 70 may be any layer such as a black matrix, a signal line, or a gate line, for example, as long as it is capable of light-shielding.

In other words, in the display device 1 according to the first embodiment, the light shields 70 are disposed at regular intervals for the display section 4 such that a transmittance of light transmitted through the unit region 150 in the barrier section 6 is kept substantially the same regardless of a position of the unit region 150 through which light is transmitted in the barrier section 6. Only by disposing the light shields 70 in this manner, luminance of light reaching to an eye of a user can be kept from changing even when the positional relationship between the unit region 150 in the barrier section 6 and the display section 4 transitions as a result of switching of the unit region 150 in the barrier section 6 due to head tracking or a movement of a user in the Z-axis direction. Accordingly, moire can be easily improved according to the display device 1 of the first embodiment while maintaining the optical property without requiring precise control, a change in the design size, and the like as in the conventional technique.

Even when a width of the unit region 150 in the barrier section 6 is different from that in the example illustrated in FIGS. 9 to 11, moire can be improved by setting an interval of disposing the light shields 70 for the display section 4 to satisfy the relationship same as that in the above-described case illustrated in FIG. 10. FIG. 12 is a diagram illustrating another example about transitions of a positional relationship between the unit region in the barrier section and the display section. Steps S41 to S43 illustrated in FIG. 12 represent how the positional relationship between the unit region 150 in the barrier section 6 and the display section 4 transitions as a result of switching of the unit region 150 in the barrier section 6 due to head tracking or a movement of a user in the Z-axis direction as with the example illustrated in FIG. 11.

In the example illustrated in FIG. 12, the light shields 70 are disposed for the display section 4 at regular intervals h2 in the X-axis direction. At this time, the light shields 70 are disposed so as to satisfy a relationship in which the interval h2 equals a width k2 of the opening 150p of the unit region 150 as illustrated in FIG. 12 and a product of the interval h2 times n (n is an integer greater than or equal to 1) equals the pixel width W1 when performing head tracking. By doing so, even when the positional relationship between the unit region 150 in the barrier section 6 and the display section 4 transitions, an area occupied by the light shield 70 is kept the same at a position in the display section 4 corresponding to the position of the opening 150p as illustrated in FIG. 12. Therefore, given that light transmittances in the pixels 50x and 50y are substantially the same, the transmittance of light transmitted through the opening 150p is kept substantially the same.

Figure 13:
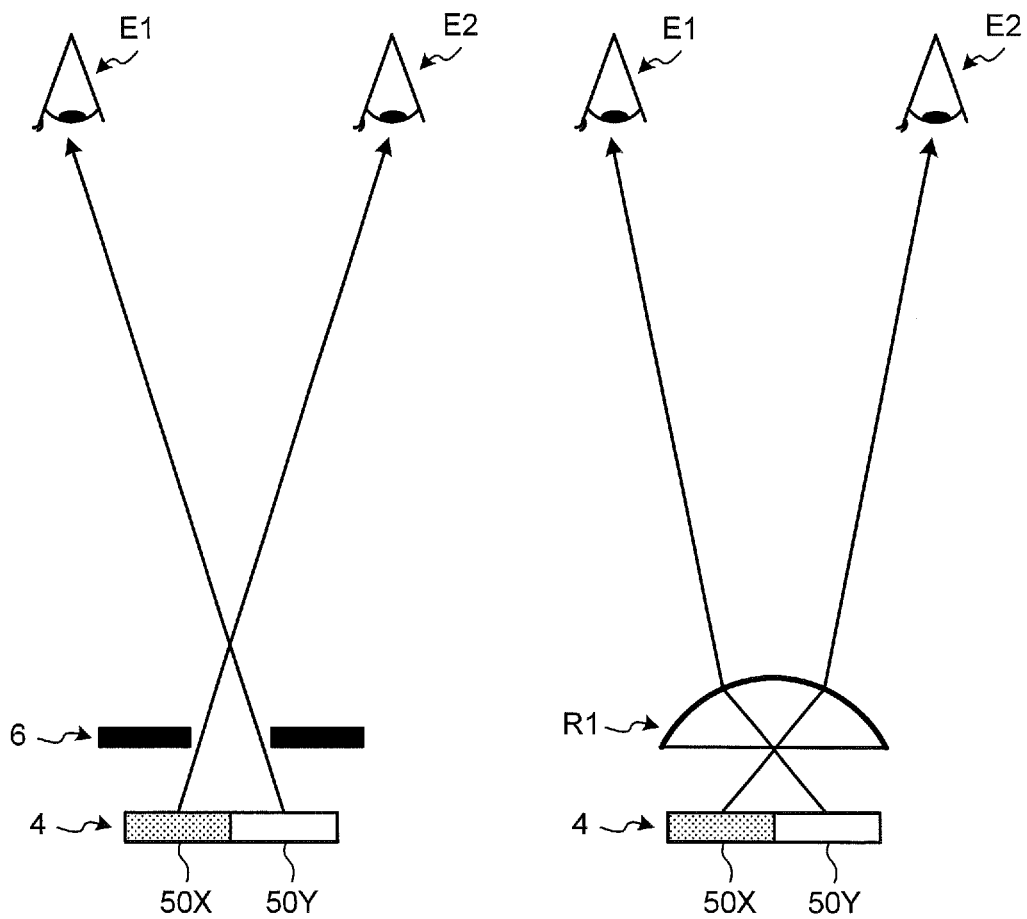
FIG. 13 is a diagram illustrating an outline of a function of a lens section.
Figure 14:
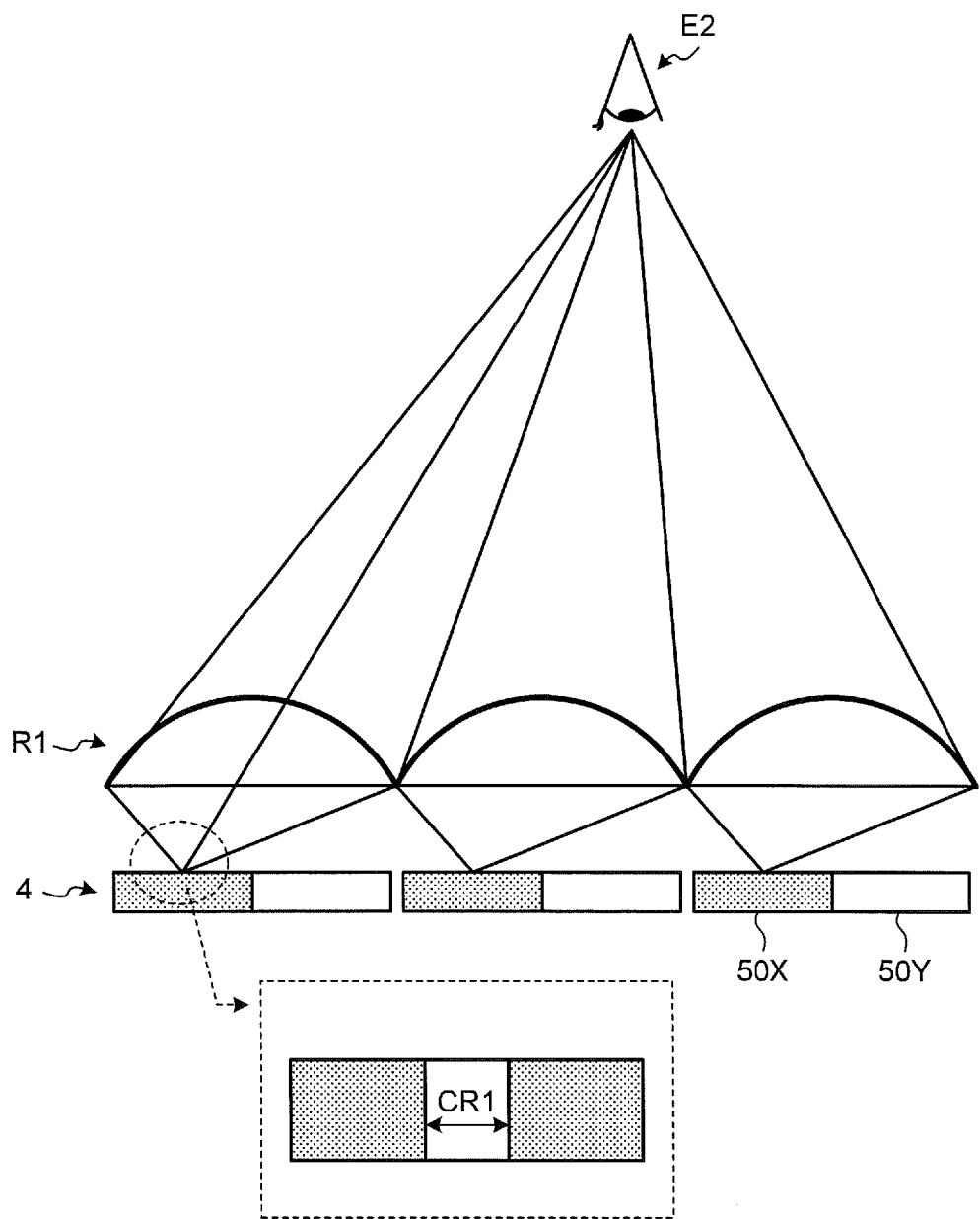
FIG. 14 is a diagram illustrating a light condensing width by the lens section.

In the above-described first embodiment, a lens section such as a liquid crystal lens or a lenticular lens may be applied to the display device 1 as substitute for the barrier section 6. By setting the lens section to condense light on the pixels included in the display section 4, the lens section achieves a function similar to that of the barrier section 6. FIG. 13 is a diagram illustrating an outline of the function of the lens section. FIG. 14 is a diagram illustrating a light condensing width made by the lens section.

As illustrated in FIG. 13, in order to allow a user to recognize a three-dimensional image, a lens section R1 deflects a traveling direction of light so that an image for a right eye is incident on the right eye (for example, E1) of the user and an image for a left eye is incident on the left eye (for example, E2) from among images displayed on a plurality of pixels (for example, 50X and 50Y) included in the display section 4. The display device 1 applies a stepwisely-different voltage to the lens section R1 by an electrode. This causes liquid crystal molecules in a liquid crystal layer constituting part of the lens section R1 to be oriented so as to form a lenticular convex shape. As a result, the lens section R1 deflects a traveling direction of the emitting light.

When the lens section R1 is applied as substitute for the barrier section 6, a light condensing width CR1 of the lens section R1 illustrated in FIG. 14 is a portion corresponding to the unit region 150 in the barrier section 6. The light condensing width CR1 is determined, for example, by a distance between the display section 4 and the lens section R1, a voltage applied to the lens section R1, etc. As with the unit region 150 in the barrier section 6, there is a risk of generating moire also when the lens section R1 is applied to the display device 1 based on the premise that the width of the light condensing width CR1 is always constant without changing. In view of this, by disposing the light shields 70 at regular intervals for the display section 4 as in the first embodiment described above, luminance of light emitted from the lens section R1 with the light condensing width CR1 is kept substantially the same regardless of a light emitting position in the lens section R1. As a result, the luminance of light reaching to an eye of a user can be kept from changing. Thus, even when the lens section R1 is applied to the display device 1 as substitute for the barrier section 6, moire can be easily improved.

1-2. Second Embodiment

The above-described first embodiment described an example in which the light shields 70 are disposed at regular intervals for the display section 4 such that a transmittance of light transmitted through the opening 150p is kept substantially the same. The following second embodiment will describe an example in which a transmittance of the unit region 150 in the barrier section 6 is adjusted such that a transmittance of light transmitted through the opening 150p is kept substantially the same.

Figure 15:
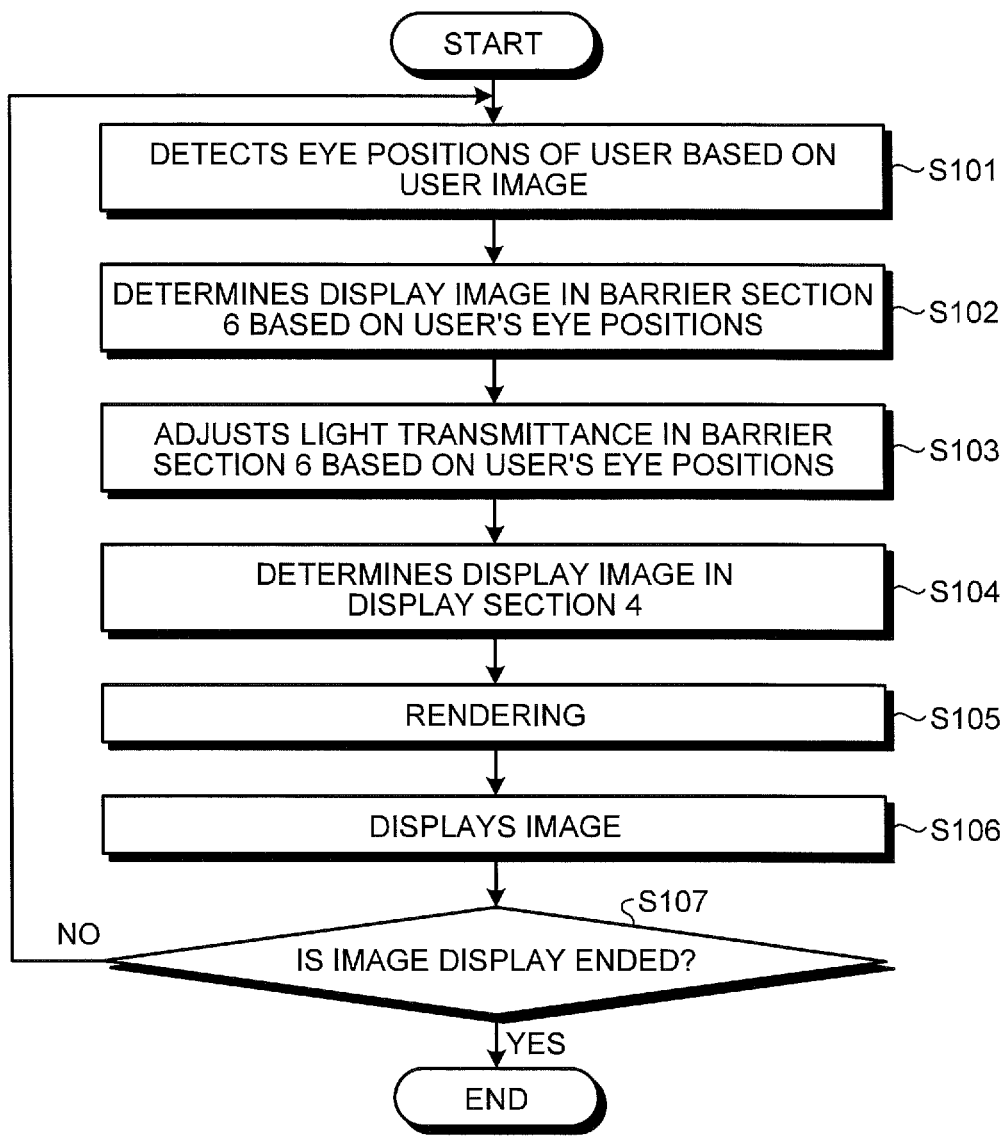
FIG. 15 is a flow chart illustrating a flow of control by a display device according to a second embodiment.

FIG. 15 is a flow chart illustrating a flow of control by a display device according to the second embodiment. The control illustrated in FIG. 15 is performed by the control section 9.

As illustrated in FIG. 15, the control section 9 detects eye positions of a user based on an image of the user captured by the imaging section 8 (step S101). For example, the control section 9 detects a facial contour of the user from the image of the user to identify the position of the user's face in the image. Thereafter, the control section 9 identifies the positions of the user's eyes included in the face by means of pattern matching or the like. Based on the sizes of the eyes and the distance between the eyes, the control section 9 detects eye positions of the user with respect to the display device 1. Alternatively, the control section 9 may detect the eye positions of the user with respect to the display device 1 by identifying the positions of eyeballs (the right eye and the left eye) of the user in the image based on light amount differences among a pupil, an iris, and a sclera included in the image of the user. When detecting the eye positions of the user, the control section 9 also calculates a distance in the Z-axis direction (see FIG. 2, for example) between the user and the display surface 4S of the display section 4. For example, assume that the distance between the eyes of the user on the image captured by the imaging section 8 has been measured in advance by the control section 9 to be "t1" when the distance in the Z-axis direction between the user and the display surface 4S of the display section 4 is "T1." Then, if the distance between the eyes of the user on the image captured by the imaging section 8 is "0.5×t1" in the step S101, for example, the control section 9 calculates the distance in the Z-axis direction between the user and the display surface 4S of the display section 4 as "0.5×T1."

Subsequently, the control section 9 determines a display image in the barrier section 6 based on the eye positions of the user (step S102). For example, the control section 9 determines regions through which light is transmitted from among the unit regions 150 in the barrier section 6 so that an image for a right eye is incident on the right eye of the user and an image for a left eye is incident on the left eye based on the distance between the display section 4 and the barrier section 6 and the eye positions of the user with respect to the display device 1 (the display section 4 and the barrier section 6). On the other hand, the control section 9 determines regions where light is shielded from among the unit regions 150 in the barrier section 6 in order to prevent crosstalk from occurring. The control section 9 then determines an image achieving a combination of the unit regions 150 through which light is transmitted and the unit regions 150 where light is shielded in the barrier section 6 as the display image in the barrier section 6.

Figure 16:
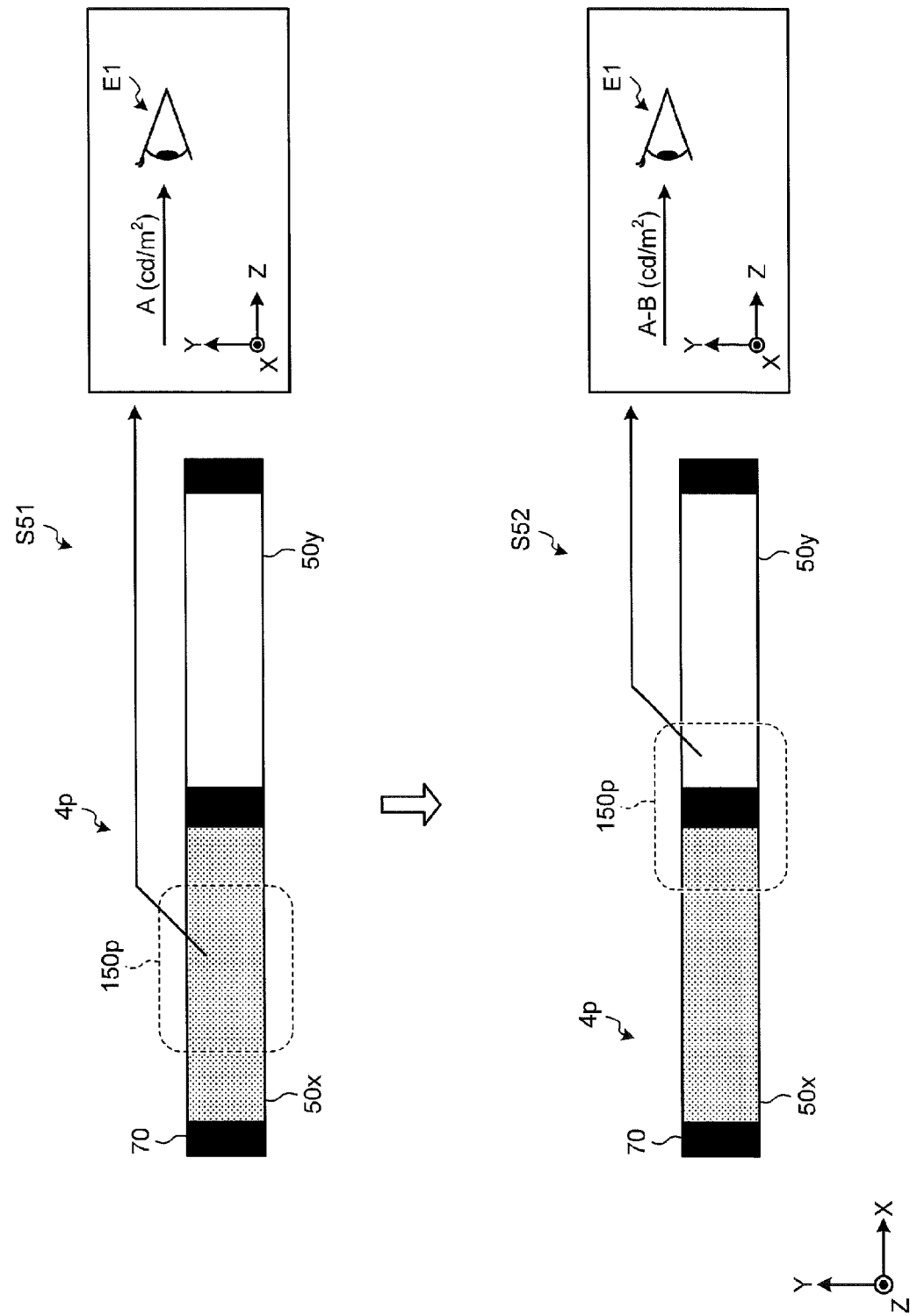
FIG. 16 is a diagram illustrating one example of luminance of light incident on an eye of a user.

Subsequently, the control section 9 adjusts a light transmittance in the barrier section 6 based on the eye positions of the user (step S103). FIG. 16 is a diagram illustrating one example of luminance of light incident on an eye of a user. Steps S51 and S52 illustrated in FIG. 16 represent how a positional relationship between the unit region 150 in the barrier section 6 and the display section 4 transitions as a result of switching of the unit region 150 in the barrier section 6 due to head tracking or a movement of a user in the Z-axis direction. For example, assume that the luminance of light reaching to the eye E1 of the user was A (cd/m²: candela per square meter) in the previous processing by the control section 9 (see the step S51, for example). Subsequently, assume that in accordance with the position of the eye E1 of the user detected by the step S101, the luminance of light reaching to the eye E1 of the user was A–B (cd/m²: candela per square meter) in the current processing by the control section 9 (see the step S52, for example). In this case, the control section 9 calculates an adjustment coefficient α such as to satisfy A≅α×(A–B). Based on the adjustment coefficient α, the control section 9 increases the light transmittance in the barrier section 6. Contrary to the example illustrated in FIG. 16, when the luminance of light reaching to the eye E1 of the user in the previous processing is A–B (cd/m²) and the luminance of light reaching to the eye E1 of the user in the current processing is A (cd/m²), the control section 9 calculates an adjustment coefficient α such as to satisfy A×α≅(A–B). Based on this adjustment coefficient α, the control section 9 decreases the light transmittance in the barrier section 6.

For example, the adjustment coefficient α is calculated by a ratio between a pixel width and a width of the light shield 70 in the opening 150p. For example, assume that the pixel width in the opening 150p is 30 (μm: micrometer) and the width of the light shield 70 in the opening 150p is 5 (μm: micrometer) in the step S52 illustrated in FIG. 16. Then, the adjustment coefficient α when the light transmittance is increased is calculated as the adjustment coefficient α=30/(30−5) since the transmittance needs to be increased only by an amount corresponding to that shielded by the light shield 70. On the other hand, the adjustment coefficient α when the light transmittance is decreased is calculated as the adjustment coefficient α=(30−5)/30 since the transmittance needs to be decreased only by an amount corresponding to that shielded by the light shield 70. By adjusting the light transmittance in the barrier section 6 in this manner, the control section 9 can make the luminance of light reaching to the eye E1 of the user kept substantially the same.

Subsequently, the control section 9 determines a display image in the display section 4 (step S104). For example, after determining pixel display of an image for a right eye and an image for a left eye based on the display image in the barrier section 6, the control section 9 determines a display image by making an adjustment to generate a predetermined disparity between the image for a right eye and the image for a left eye. Subsequently, the control section 9 performs rendering (step S105) and displays the image on the display section 4 (step S106).

Subsequently, the control section 9 determines if the image display is ended (step S107). When the image display is ended as a result of the determination (Yes in the step S107), the control section 9 ends the control illustrated in FIG. 15. When the image display is not ended as a result of the determination (No in the step S107), on the other hand, the control section 9 returns to the procedure of the above-described step S101 to continue the control illustrated in FIG. 15.

2. APPLICATION EXAMPLES

Examples in which the above-described display device 1 is applied to electronic apparatuses will be described as application examples of the present disclosure.

FIGS. 17 to 25 are diagrams each illustrating one example of an electronic apparatus including the display device according to any of the present embodiments. The display device 1 according to any of the present embodiments can be applied to electronic apparatuses in any field such as a portable electronic apparatus such as a mobile phone or a smartphone, a television set, a digital camera, a notebook personal computer, a video camera, and a meter installed in a vehicle. In other words, the display device 1 according to the any of present embodiments can be applied to electronic apparatuses in any fields for displaying externally-inputted video signals or internally-generated video signals as images or videos. The electronic apparatus includes a control device for providing video signals to the display device and controlling operations of the display device.

Application Example 1

Figure 17:
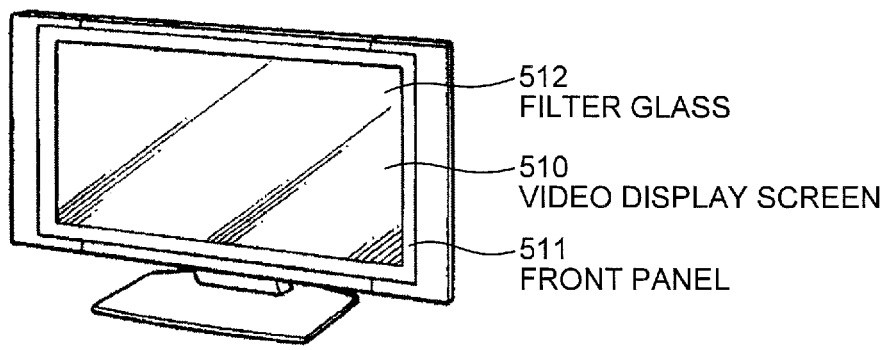
FIG. 17 is a diagram illustrating one example of an electronic apparatus including the display device according to the present embodiments.

An electronic apparatus illustrated in FIG. 17 is a television set to which the display device 1 according to any of the present embodiments is applied. This television set has a video display screen 510 including a front panel 511 and a filter glass 512, for example. This video display screen 510 is the display device according to any of the present embodiments.

Application Example 2

Figure 18:
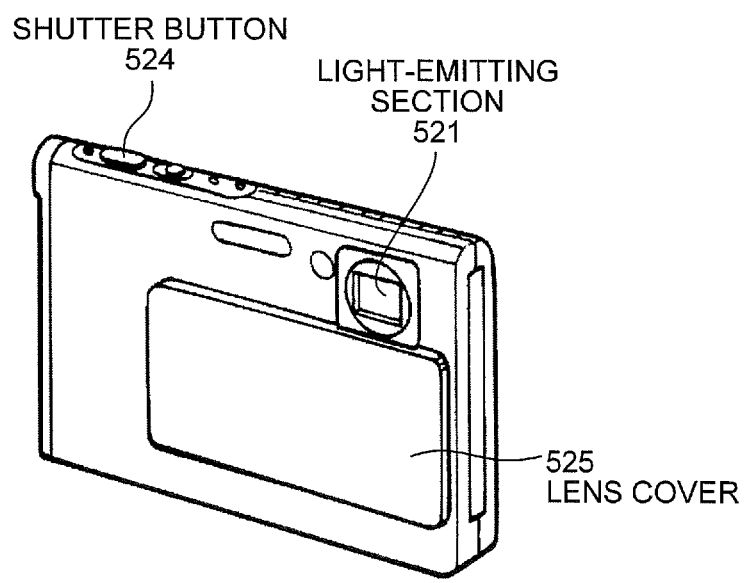
FIG. 18 is a diagram illustrating one example of an electronic apparatus including the display device according to the present embodiments.
Figure 19:
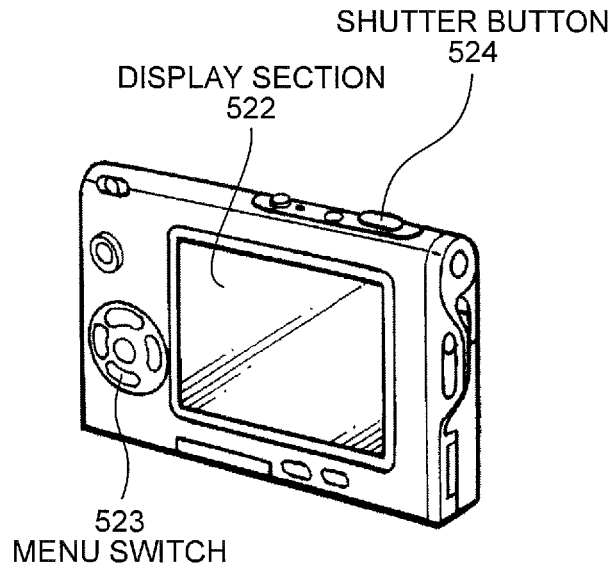
FIG. 19 is a diagram illustrating one example of an electronic apparatus including the display device according to the present embodiments.

An electronic apparatus illustrated in FIGS. 18 and 19 is a digital camera to which the display device 1 according to any of the present embodiments is applied. This digital camera includes: a flash light-emitting section 521; a display section 522; a menu switch 523; and a shutter button 524, for example. The display section 522 is the display device according to any of the present embodiments. As illustrated in FIG. 18, this digital camera includes a lens cover 525. When the lens cover 525 is slid, a photographic lens appears. The digital camera can take a digital photo by imaging light entering from the photographic lens.

Application Example 3

Figure 20:
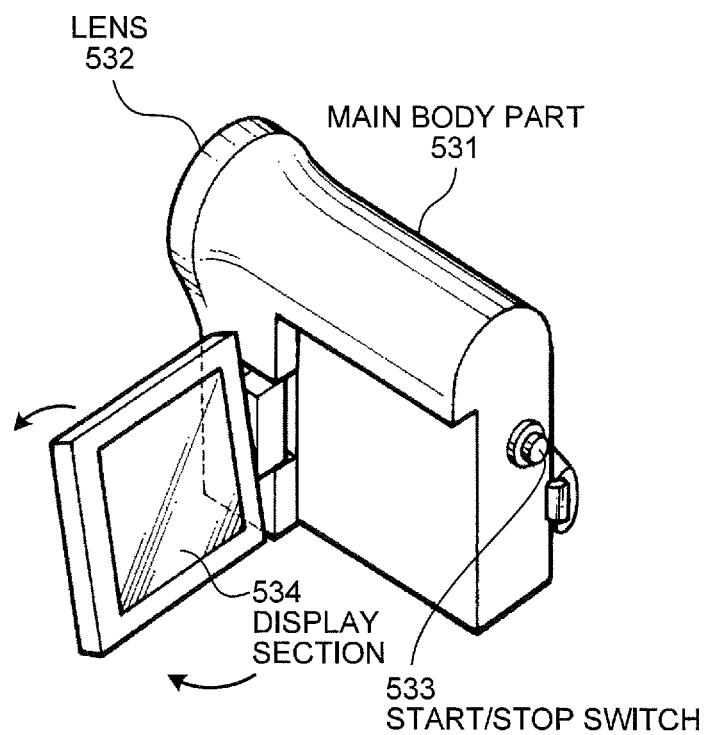
FIG. 20 is a diagram illustrating one example of an electronic apparatus including the display device according to the present embodiments.

An electronic apparatus illustrated in FIG. 20 represents an appearance of a video camera to which the display device 1 according to any of the present embodiments is applied. This video camera includes: a main body part 531; a lens 532 for capturing an object, which is provided on a front side surface of the main body part 531; a filming start/stop switch 533; and a display section 534, for example. The display section 534 is the display device according to any of the present embodiments.

Application Example 4

Figure 21:
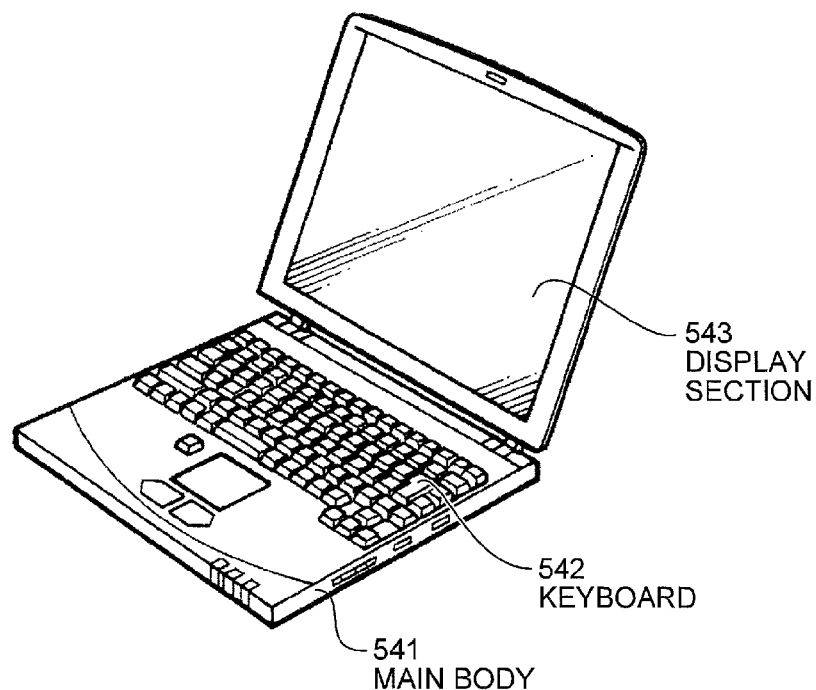
FIG. 21 is a diagram illustrating one example of an electronic apparatus including the display device according to the present embodiments.

An electronic apparatus illustrated in FIG. 21 is a notebook personal computer to which the display device 1 according to any of the present embodiments is applied. This notebook personal computer includes: a main body 541; a keyboard 542 provided for an operation of inputting characters and the like; and a display section 543 for displaying an image, for example. The display section 543 is configured of the display device according to any of the present embodiments.

Application Example 5

Figure 22:
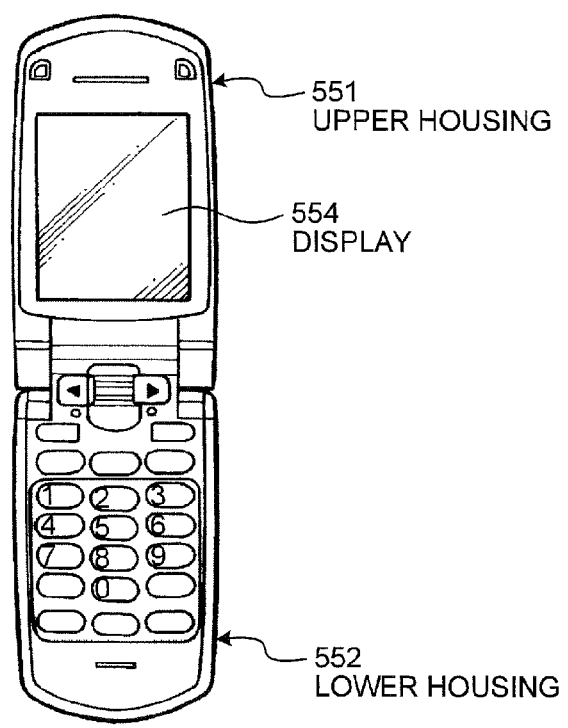
FIG. 22 is a diagram illustrating one example of an electronic apparatus including the display device according to the present embodiments.
Figure 23:
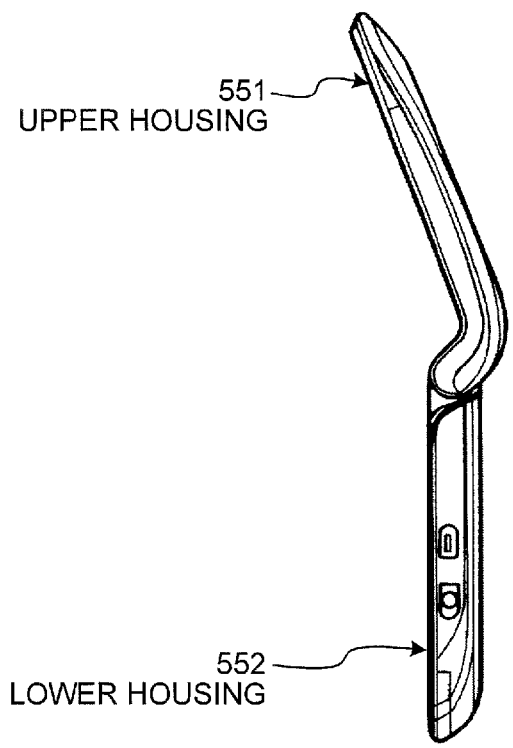
FIG. 23 is a diagram illustrating one example of an electronic apparatus including the display device according to the present embodiments.
Figure 24:
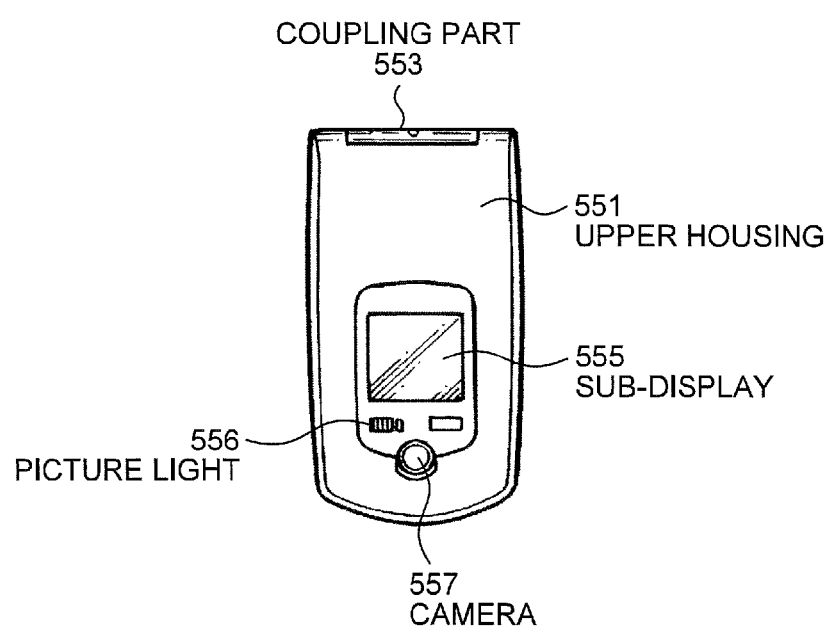
FIG. 24 is a diagram illustrating one example of an electronic apparatus including the display device according to the present embodiments.

An electronic apparatus illustrated in FIGS. 22 to 24 is a mobile phone to which the display device 1 according to any of the present embodiments is applied. FIG. 22 is a front view of the mobile phone in an unfolded state. FIG. 23 is a right side view of the mobile phone in the unfolded state. FIG. 24 is a front view of the mobile phone in a folded state. For example, this mobile phone is configured by coupling an upper housing 551 with a lower housing 552 by means of a connecting part (hinge part) 553, and includes: a display 554; a sub-display 555; a picture light 556; and a camera 557. The display device 1 is attached to the display 554. The display 554 of the mobile phone may have a function of detecting touch operations in addition to the function of displaying images.

Application Example 6

Figure 25:
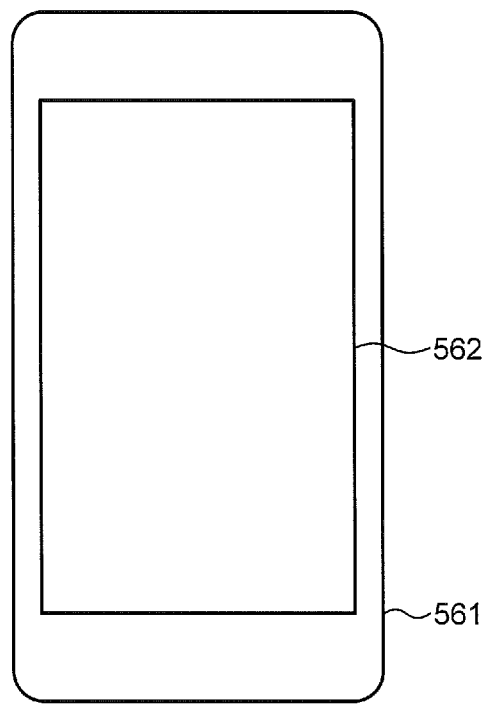
FIG. 25 is a diagram illustrating one example of an electronic apparatus including the display device according to the present embodiments.
Figure 26:
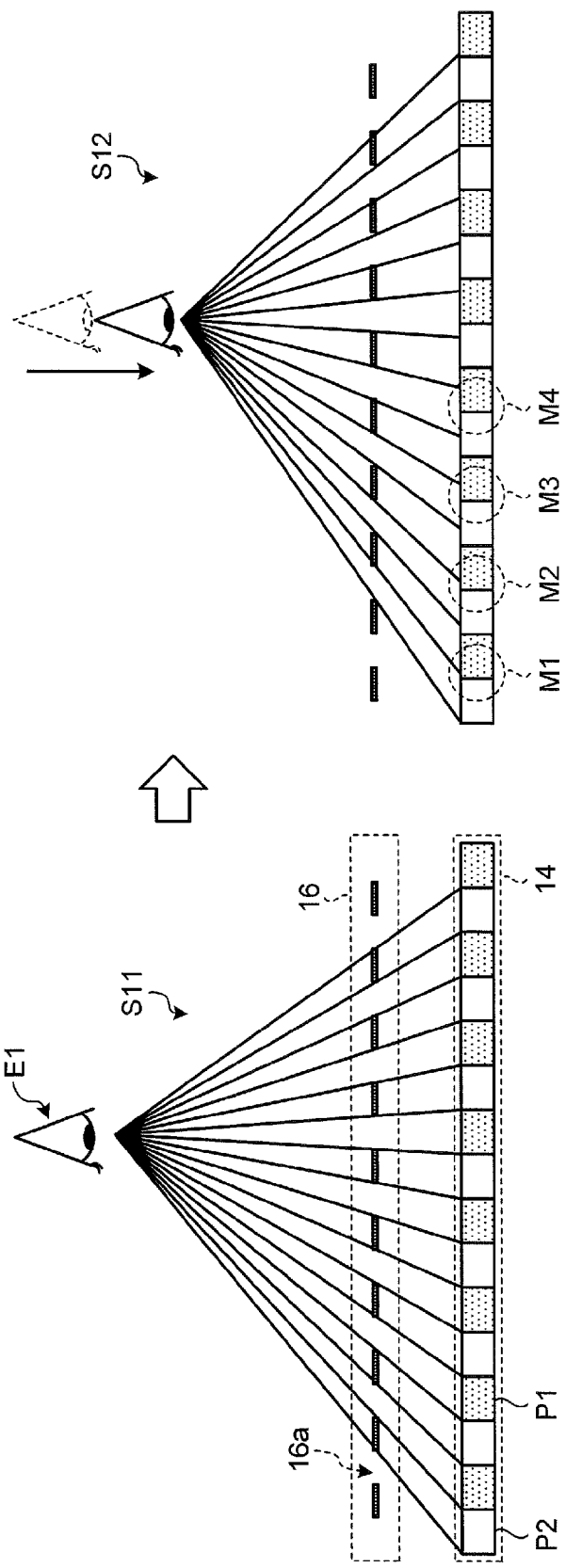
FIG. 26 is a diagram for explaining moire.
Figure 27:
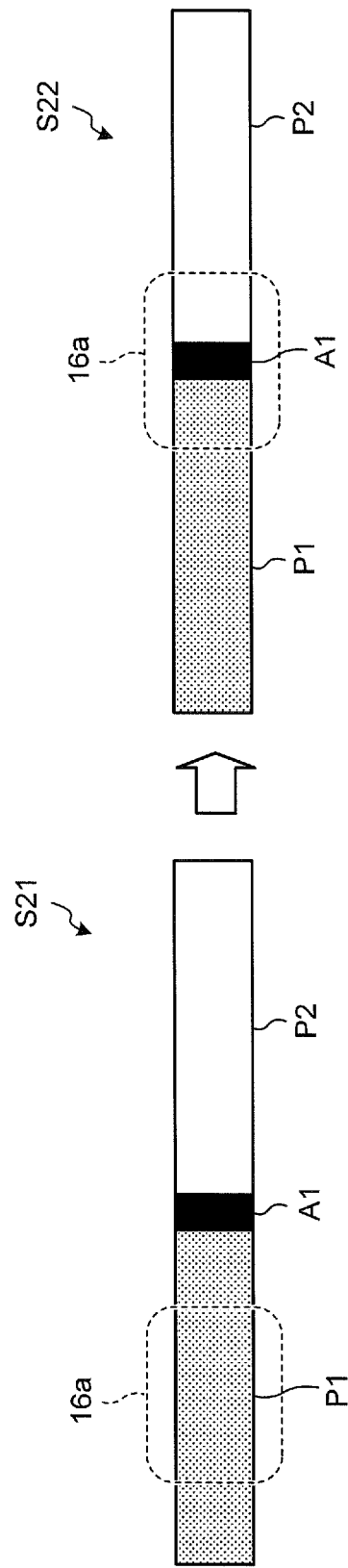
FIG. 27 is a diagram for explaining moire.

An electronic apparatus illustrated in FIG. 25 is operated as a portable computer, a multifunctional mobile phone, a portable computer capable of making a voice phone call, or a portable computer capable of communications. This is a personal digital assistant sometimes referred to as a so-called smartphone or tablet terminal. This personal digital assistant includes a display section 562 on a surface of a housing 561, for example. This display section 562 is the display device according to any of the present embodiments.

3. ASPECTS OF THE PRESENT DISCLOSURE

The present disclosure includes the following aspects.
(1) A display device comprising:
  a display section;
  a barrier section in which a plurality of unit regions are arranged in columns in a first direction, the plurality of unit regions extending in a second direction perpendicular to the first direction; and
  a plurality of light shields disposed at regular intervals for the display section such that a transmittance of light transmitted through a unit region is kept substantially the same regardless of a position of the unit region through which light is transmitted in the barrier section.
(2) The display device according to (1), wherein at least a width of each of the unit regions in the first direction and the interval of disposing the light shields are substantially the same.
(3) The display device according to (1), further comprising:
  an imaging section for detecting an eye position of a user; and
  a control section for determining a unit region through which light is transmitted from among the plurality of unit regions based on the eye position of the user.
(4) The display device according to (1), wherein
  the display section includes a first pixel for displaying an image for a right eye and a second pixel for displaying an image for a left eye, and
  the barrier section performs light shielding so as to prevent the image for a right eye and the image for a left eye from being incident on a left eye and a right eye of a user, respectively.
(5) A display device comprising:
  a display section;
  a lens section disposed on a display surface side of the display section; and
  a plurality of light shields disposed at regular intervals for the display section such that luminance of light emitted from the lens section is kept substantially the same regardless of a light emitting position in the lens section.

In the display device of the present disclosure, the light shields are disposed at regular intervals for the display section such that a transmittance of light transmitted through the unit region in the barrier section is kept substantially the same regardless of a position of the unit region through which light is transmitted in the barrier section, for example. Only by disposing the light shields in this manner, luminance of light reaching to an eye of a user can be kept from changing even when a positional relationship between the unit region in the barrier section and the display section transitions as a result of switching of the unit region due to head tracking or an approach by the user. Accordingly, moire can be easily improved.

The display device of the present disclosure can easily improve moire while maintaining the optical property without requiring precise control, a change in the design size, and the like.

What is claimed is:
1. A display device comprising:
  a display section including a plurality of pixels;
  a barrier section in which a plurality of unit regions are arranged in columns in a first direction, the plurality of unit regions extending in a second direction perpendicular to the first direction; and
  a plurality of light shields disposed at regular intervals for the display section such that a transmittance of light transmitted through a unit region is kept the same regardless of a position of the unit region through which light is transmitted in the barrier section, the light shields being elements that are separate from or part of the display section,
  wherein at least a width of each of the unit regions in the first direction and the interval of disposing the light shields are the same,
  wherein a width of one pixel of the plurality of pixels in the first direction is n times as large as the interval, n being an integer greater than or equal to 1,
  wherein the plurality of pixels includes a first pixel for displaying an image for a right eye and a second pixel for displaying an image for a left eye,
  wherein the barrier section performs light shielding so as to prevent the image for a right eye and the image for a left eye from being incident on a left eye and a right eye of a user, respectively, and
  wherein the barrier section is a liquid crystal panel that applies a voltage to the unit region that transmits a light or the unit region that shields a light to orient liquid crystals, thereby switching, for the light entering into each of the unit regions, between being transmitted and being shielded.
2. The display device according to claim 1, further comprising:
  an imaging circuitry for detecting an eye position of a user; and
  a control circuitry for determining a unit region through which light is transmitted from among the plurality of unit regions based on the eye position of the user.

* * * * *